(12) United States Patent
Kim et al.

(10) Patent No.: US 11,550,498 B2
(45) Date of Patent: Jan. 10, 2023

(54) STORAGE DEVICE AND RETRAINING METHOD THEREOF

(71) Applicant: SAMSUNG ELECTRONICS CO., LTD., Seongnam-si (KR)

(72) Inventors: Tongsung Kim, Seongnam-si (KR); Jangwoo Lee, Seongnam-si (KR); Seonkyoo Lee, Hwaseong-si (KR); Chiweon Yoon, Seoul (KR); Jeongdon Ihm, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 17/030,635

(22) Filed: Sep. 24, 2020

(65) Prior Publication Data
US 2021/0349660 A1    Nov. 11, 2021

(30) Foreign Application Priority Data
May 6, 2020    (KR) ......................... 10-2020-0053797

(51) Int. Cl.
*G06F 3/06* (2006.01)
*G06K 9/62* (2022.01)

(52) U.S. Cl.
CPC .......... *G06F 3/0658* (2013.01); *G06F 3/0604* (2013.01); *G06F 3/0679* (2013.01); *G06K 9/6256* (2013.01)

(58) Field of Classification Search
CPC .. G06F 11/16; G06F 11/1604; G06F 11/1608; G06F 11/1612; G06F 11/1616; G06F 11/1625; G06F 11/1629; G11C 7/222; G11C 7/1078
See application file for complete search history.

(56) References Cited

U.S. PATENT DOCUMENTS

| 8,760,946 B2 | 6/2014 | Dearth et al. |
| 10,216,420 B1* | 2/2019 | Kannan ............... G06F 11/0727 |
| 10,403,375 B2 | 9/2019 | Lee et al. |
| 10,482,041 B2* | 11/2019 | Morris ............... G06F 13/1689 |

(Continued)

OTHER PUBLICATIONS

S.-M. Lee et al., "23.6 A 0.6V 4.266Gb/s/pin LPDDR4X interface with auto-DQS cleaning and write-VWM training for memory controller," 2017 IEEE International Solid-State Circuits Conference (ISSCC), 2017, pp. 398-399. (Year: 2017).*

(Continued)

*Primary Examiner* — Khoa D Doan
(74) *Attorney, Agent, or Firm* — Volentine, Whitt & Francos, PLLC

(57) ABSTRACT

A storage device includes NVM package and a controller connected to the NVM package through a channel and controlling operation of the NVM package. The NVM package includes an interface chip, first NVM devices connected to the interface chip through a first internal channel and second NVM devices connected to the interface chip through a second internal channel. The interface chip selects the first internal channel in response to an operation request received from the controller and connects the first internal channel to the channel. The interface chip also determines whether retraining is necessary in relation to the second internal channel and transmits a retraining request to the controller when retraining is necessary.

19 Claims, 21 Drawing Sheets

(56) References Cited

U.S. PATENT DOCUMENTS

| | | | |
|---|---|---|---|
| 10,504,570 B2* | 12/2019 | Hotaruhara | G11C 7/222 |
| 10,545,866 B1 | 1/2020 | Kato et al. | |
| 2010/0325372 A1 | 12/2010 | Housty et al. | |
| 2013/0176787 A1* | 7/2013 | Ross | G11C 8/18 |
| | | | 365/185.18 |
| 2015/0095565 A1* | 4/2015 | Morris | G11C 11/4093 |
| | | | 711/147 |
| 2015/0213849 A1 | 6/2015 | Srinivas et al. | |
| 2016/0364143 A1 | 12/2016 | Webb et al. | |
| 2019/0043571 A1 | 2/2019 | Damle et al. | |
| 2019/0050159 A1* | 2/2019 | Jung | G06F 3/0659 |
| 2019/0122714 A1 | 4/2019 | Shin et al. | |
| 2019/0354431 A1 | 11/2019 | Lee et al. | |

OTHER PUBLICATIONS

M. Rajab, J.-P. Thiers and J. Freudenberger, "Read Threshold Calibration for Non-Volatile Flash Memories," 2019 IEEE 9th International Conference on Consumer Electronics (ICCE-Berlin), 2019, pp. 109-113, doi: 10.1109/ICCE-Berlin47944.2019.8966181. (Year: 2019).*

European Search Report dated Aug. 13, 2021.

9. Tae-Young Oh, et al. "A 3.2 Gbps/pin 8 Gbit 1.0 V LPDDR4 SDRAM With Integrated ECC Engine for Sub-1 V DRAM Core Operation", IEEE Journal of Solid-State Circuits, vol. 50, No. 1, Jan. 2015.

* cited by examiner

STORAGE DEVICE AND RETRAINING METHOD THEREOF

CROSS-REFERENCE TO RELATED APPLICATION(S)

This application claims benefit of priority to Korean Patent Application No. 10-2020-0053797 filed on May 6, 2020 in the Korean Intellectual Property Office, the disclosure of which is incorporated herein by reference in its entirety.

BACKGROUND

Embodiments of the inventive concept relate generally to storage devices and methods of retraining the constituent non-volatile memory devices (hereafter, singularly or collectively, "NVM) in same.

The use of various error detection and/or correction techniques is known to be particularly useful in relation to volatile and non-volatile memories. Many storage devices including NVM are equipped with controller(s) that are capable of training (or calibrating) the NVM in storage devices to detect and/or minimize data errors.

In general, the operating frequency of a storage device may vary with power and/or temperature conditions, thereby causing signal propagation delays, noise and/or signal timing skews—all of which degrade data integrity. Accordingly, it is necessary for storage devices to better align data signals through retraining operations between a controller and NVM in order to compensate for data degradation.

SUMMARY

Certain embodiments of the inventive concept provide storage devices capable of retraining NVM without temporal and/or regional limitations. Other embodiments of the inventive concept provide retraining methods for storage devices.

According to an embodiment of the inventive concept, a storage device includes a non-volatile memory (NVM) package, and a controller connected to the NVM package through a channel, and configured to control the NVM package. The NVM package includes an interface chip, first NVM devices connected to the interface chip through a first internal channel and second NVM devices connected to the interface chip through a second internal channel, the interface chip is configured to select the first internal channel in response to an operation request received from the controller and connect the first internal channel to the channel, and to determine whether retraining is necessary in relation to the second internal channel and transmit a retraining request to the controller when retraining is necessary.

According to an embodiment of the inventive concept, a storage device includes; a non-volatile memory (NVM) package including an interface chip, first NVM devices connected to the interface chip through a first internal channel, and second NVM devices connected to the interface chip through a second internal channel, wherein the interface chip is configured to select one of the first internal channel and the second internal channel, thereby designating one of the first internal channel and the second internal channel as a selected internal channel and designating other one of the first internal channel and the second internal channel as an unselected internal channel, and the interface chip is further configured to determine whether retraining of the unselected internal channel is necessary and upon determining that retraining of the unselected internal channel is necessary, providing a retraining request; and a controller connected to the interface chip through a channel, wherein the controller is configured to transmit a retraining command to the NVM package in response to the retraining request.

According to an embodiment of the inventive concept, a storage device includes a retraining method for a storage device, wherein the includes; determining whether retraining is necessary in relation to an unselected internal channel by an interface chip, and transmitting a retraining request from the interface chip to a controller upon determining that the retraining is necessary.

BRIEF DESCRIPTION OF DRAWINGS

The above and other aspects, features, and advantages of the inventive concept may be better understood by review of the following detailed description taken in conjunction with the accompanying drawings, in which.

DETAILED DESCRIPTION

Hereinafter, certain embodiments of the inventive concept will be described with reference to the accompanying drawings.

Embodiments of the inventive concept include storage devices capable of determining whether retraining is necessary using an unselected channel in a memory input/output (I/O) structure, and using a buffer chip to perform retraining in accordance with the determination.

Figure 1:
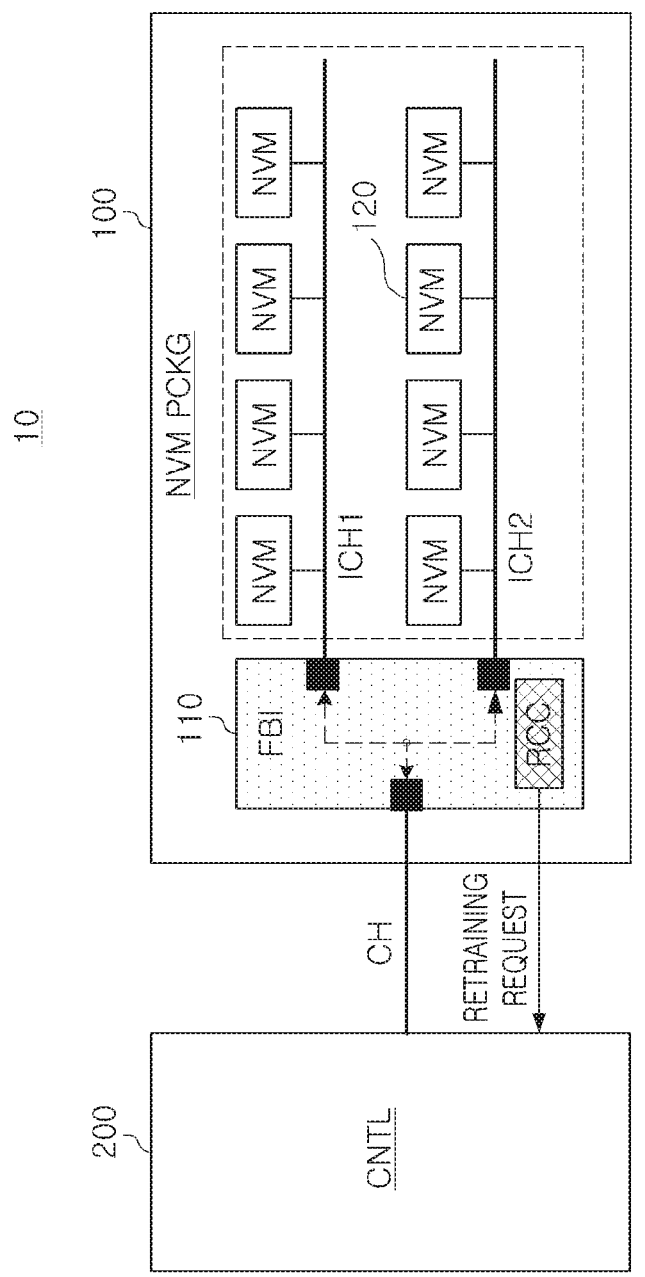
FIG. 1 is a diagram illustrating a storage device according to embodiments of the inventive concept.

Figure (FIG. 1 is a block diagram illustrating a storage device 10 according to embodiments of the inventive concept. Referring to FIG. 1, the storage device 10 may include a NVM package (NVM PCKG) 100 and a memory controller (CNTL) 200 configured to control the NVM package 100.

The NVM package 00 may include an interface chip 110 (e.g., a frequency boosting interface chip (FBI) or a buffer chip) and a plurality of NVM 120 connected to the interface chip 110 (e.g.,) via a first internal channel ICH1 and a second internal ICH2. Here, it should be noted that more than two (2) internal channels may be used to connect the NVM to the interface chip 110.

The interface chip 110 may be connected to the controller 200 through a channel CH, such that the channel CH may be effectively and flexibly connected to one or more of the available internal channels (e.g., the first internal channel ICH1 and/or the second internal channel ICH2) through the interface chip 110.

In the illustrated example of FIG. 1, the interface chip 110 includes a retraining checking circuit (RCC) 111 capable of determining whether internal retraining of the NVM is necessary, and controlling the execution of a retraining method between the interface chip 110 and the NVM package 100 in response to the determination.

The retraining checking circuit (RCC) 111 may be configured to determine whether retraining is necessary using an unselected internal channel (hereafter, "unselected channel") as between (e.g.,) the first internal channel ICH1 and the second internal channel ICH2. For example, the retraining checking circuit 111 may include a built-in self-test (BIST) circuit, an oscillator and/or a delay locked loop (DLL).

In effect, the retraining checking circuit (RCC) 111 effectively designates one of the available internal channels as a selected internal channel and further designates another one of the available internal channels as an unselected internal channel.

Regardless of specific implementation and/or configuration, the retraining checking circuit 111 may be used to check an aligned state between test pattern data (i.e., expected data) which has passed through a data transmission path of an unselected channel and a clock signal which has passed through a clock transmission path of an unselected channel. The results of these aligned state check(s) may be used to determine whether retraining of the unselected channel is necessary.

Each of the NVM 120 may be variously implemented to store single level data (SLC) and/or multiple-level data (MLC). One or more NVM 120 may be connected to each of the first internal channel ICH1 and/or the second internal channel ICH2. In FIG. 1, four (4) NVM may be connected to each of the internal channels ICH1 and ICH2, but the number of NVM connected to the internal channels ICH1 and ICH2 may vary by design.

At least one of the NVM 120 may be used to store a boot loader. In this regard, the boot loader may serve, wholly or in part, as an initialization program that may be used to initialize operation of the storage device 10. Those skilled in the art will recognize that the NVM package 100 may be variously implemented using lateral and/or vertically stacked arrangements of NVM 120.

The memory controller (CNTL) 200 may be implemented to control overall operation of the NVM package 100. The memory controller 200 may define and/or control various functions necessary to the management of data stored by the NVM package 100 (e.g., address mapping, error detection and/or correction, garbage collection, wear-leveling, bad block management, etc.). Such functions may be implemented using hardware, software and/or firmware.

The controller 200 may receive a retraining request generated by and communicated from the NVM package 100. In response to the retraining request, the controller 200 may issue a retraining command and transmit the retraining command to the NVM package 100. Accordingly, the NVM package 100 may perform a retraining operation in relation to an unselected channel.

The retraining operation may include one or more data training operation(s) (e.g., a read training operation and/or a write training operation). Here, the read training operation may include an operation that effectively positions a data strobe DQS output from the NVM device connected to the unselected channel in the center of an eye pattern for read data, and the write training operation may include an operation that aligns the eye pattern of data written to the NVM using the unselected channel.

A storage device may perform an initial training operation for NVM after powering-on in order to properly obtain an optimal align condition between data and a clock signal in order to execute various operations, such as a write operation and/or a read operation. Following the initial training operation (e.g., once a predetermined time period has elapsed), skewing between data and a clock signal may occur due to a variations (e.g.,) in the storage device operating environment. Alternately or additionally, when a certain failure condition is noted (e.g., a particular bit error rate or number of bit errors is exceeded) during the execution of write operations and/or read operations, the retraining operation may again be executed to correct alignment between data and a clock signal.

Certain comparative storage devices may create a replica path from I/O blocks that used training including unmatched DQ-DQS to check the need for retraining of memory input and output, or may periodically perform retraining using an intermediate section of a normal I/O operation. However, these approaches may have temporal limitations and/or regional limitations in terms of creating the replica path.

In contrast storage devices according to embodiments of the inventive concept may check whether retraining is necessary using the interface chip 110 without such temporal and/or regional limitations, and may thereafter notify the controller 200 whether the NVM require retraining. For example, the storage device 10 of FIG. 1 may perform normal read/write operation(s) using a selected internal channel (hereafter, the "selected channel"), but may simultaneously (i.e., at least partially overlapping in time) determine whether retraining of the NVM is necessary using (or in relation to) an unselected channel. And as a result of this retraining determination, the storage device 10 may perform a retraining operation for the NVM.

Figure 2:
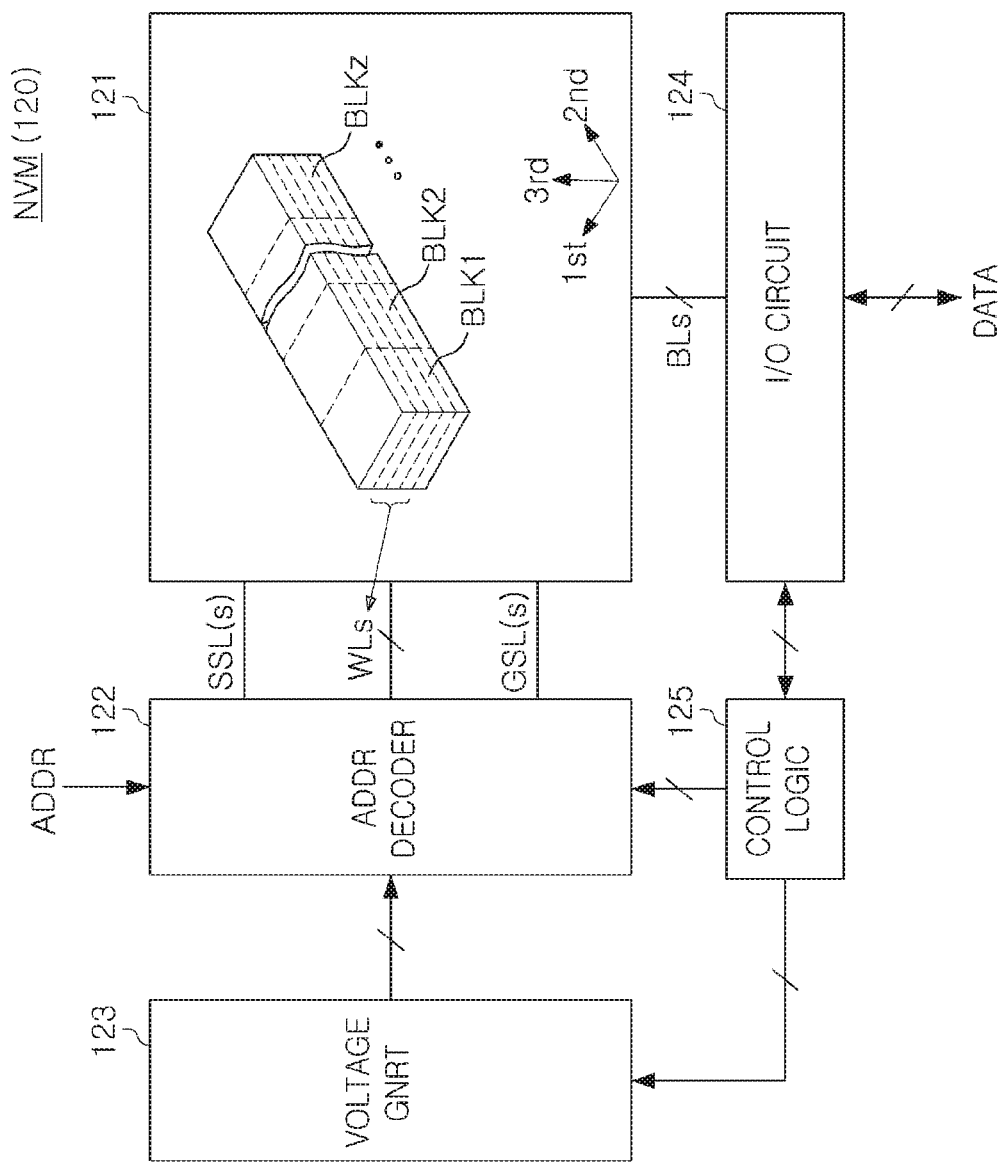
FIG. 2 is a diagram illustrating a non-volatile memory device NVM according to embodiments of the inventive concept.

FIG. 2 is a block diagram illustrating an exemplary NVM 120 according to embodiments of the inventive concept. Referring to FIG. 2, the NVM 120 includes a memory cell array 121, an address decoder 122, a voltage generation circuit 123, an input and output circuit 124 and a control logic 125.

The NVM 120 may be implemented as an NAND flash memory, a vertical NAND flash memory (VNAND), a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM). In the description that follows, the NVM 120 is assumed to be implemented as a vertical NAND flash memory device.

The memory cell array 121 may include a plurality of memory blocks BLK1 to BLKz. Each of the memory blocks BLK1 to BLKz may be connected to an address decoder 122 through word lines WLs, at least one string select line SSL, and at least one ground select line GSL, and may be connected to the input/output circuit 124 through bit lines BLs. In the example embodiment, the word lines WLs may have a stacked plate structure.

Memory blocks BLK1 to BLKz may include strings having a three-dimensional structure which may be arranged according to a first direction and a second direction (different from the first direction) on a substrate, and a third direction (a direction perpendicular to a plane formed in the first direction and the second direction). Each of the strings may include at least one string select transistor, memory cells, and at least one ground select transistor connected in series between a bit line and a common source line (CSL). Each of the memory cells may be implemented to store at least one bit where word lines WLs and bit lines BLs intersect. In an example embodiment, at least one dummy cell may be included between at least one string select transistor and a plurality of memory cells. In another example embodiment, at least one dummy cell may be included between the memory cells and the at least one ground selection transistor.

The address decoder 122 may be implemented to select one of the memory blocks BLK1 to BLKz in response to an address. Also, the address decoder 122 may be connected to the memory cell array 121 through word lines WLs, at least one string select line SSL, and at least one ground select line GSL. The address decoder 122 may select word lines WLs, string select lines SSL, and ground select lines GSL using a decoded row address. Also, the address decoder 122 may decode a column address among input addresses. The decoded column address may be transmitted to the input and output circuit 124. In an example embodiment, the address decoder 122 may include a row decoder, a column decoder, an address buffer, and the like.

The voltage generation circuit 123 may be implemented to generate voltages (program voltage, pass voltage, read voltage, read pass voltage, verify voltage, erase voltage, common source line voltage, well voltage, etc.) required for operation thereof. The voltage generator circuit 123 may generate a word line voltage required for a program/read/erase operation.

The input and output circuit 124 may be connected to the memory cell array 121 through bit lines BLs. The input and output circuit 124 may be implemented to receive the decoded column address from the address decoder 122. The input and output circuit 124 may select bit lines BLs using the decoded column address. The input and output circuit 124 may include page buffers which may store data to be programmed during a program operation or may store data read during a read operation. Each of the page buffers may include a number of latches. During the program operation, data stored in the page buffers may be programmed in a page corresponding to a selected memory block through bit lines BLs. During a read operation, data read from a page corresponding to a selected memory block may be stored in page buffers through bit lines BLs. The input and output circuit 124 may read data from a first area of the memory cell array 121 and may store the read data in a second area of the memory cell array 121. For example, the input and output circuit 124 may be implemented to perform copy-back.

The control logic 125 may be implemented to control overall operation (program/read/erase, etc.) of the non-volatile memory device 100. The control logic 125 may operate in response to control signals CTRL or commands input from an external entity.

Figure 3A:
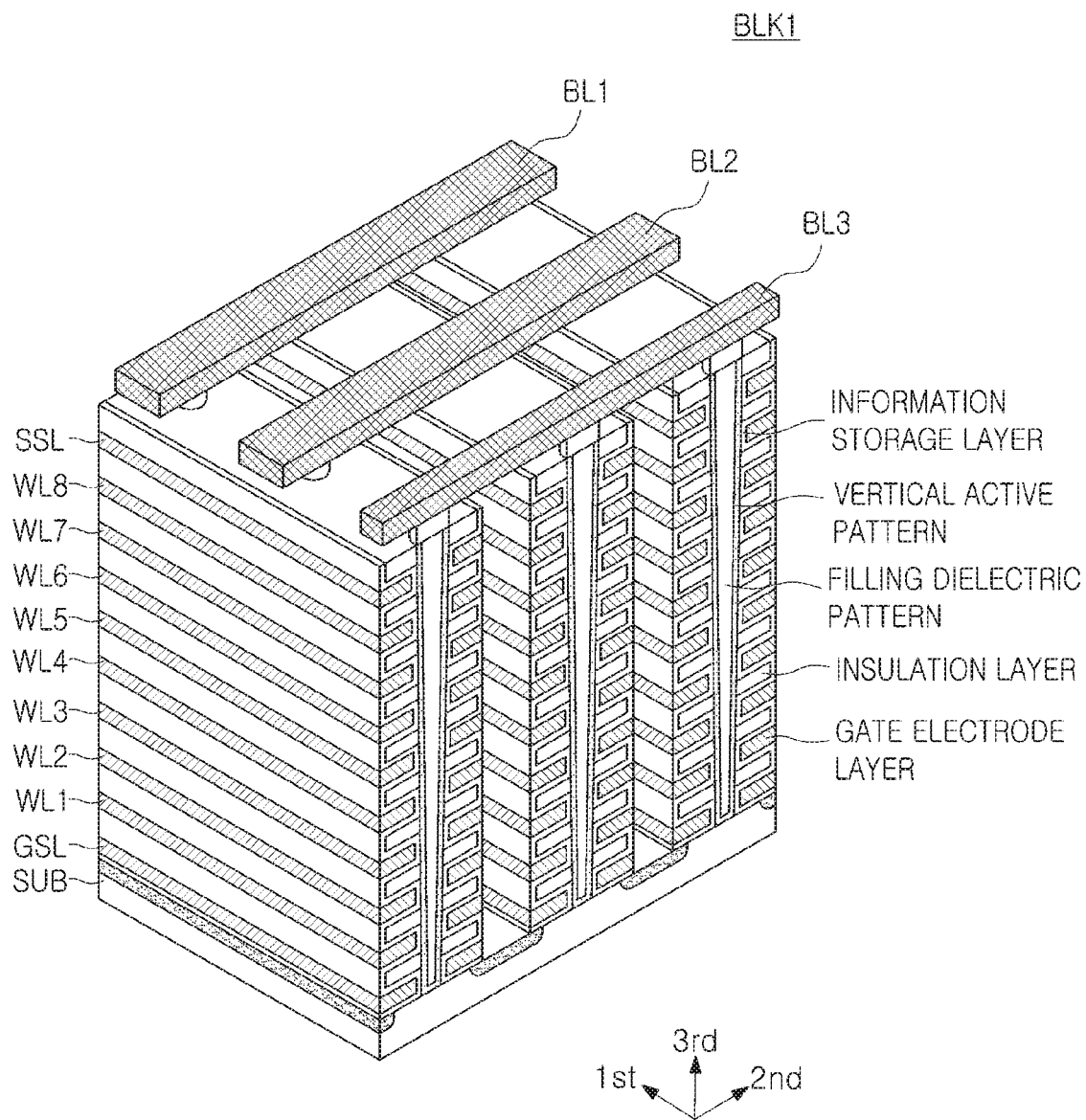
FIGS. 3A and 3B are respective, perspective diagrams illustrating a memory block according to embodiments of the inventive concept.

FIG. 3A is a perspective diagram illustrating a memory block according to an embodiment of the inventive concept. Referring to FIG. 3A, a memory block BLK1 may be formed in a direction perpendicular to a substrate SUB. An N+ doped region may be formed on the substrate SUB.

A gate electrode layer and an insulation layer may be alternately deposited on a substrate SUB. An information storage layer may be formed between the gate electrode layer and the insulation layer. When the gate electrode layer and the insulating layer are vertically patterned, a V-shaped pillar may be formed. The pillar may penetrate the gate electrode layer and the insulating layer and may be connected to the substrate SUB. The inside of the pillar may be filled with an insulating material such as silicon oxide in a filling dielectric pattern. The exterior of the pillar may be formed of a channel semiconductor in a vertical active pattern.

The gate electrode layer of the memory block BLK1 may be connected to a ground select line GSL, word lines WL1 to WL8 and a string select line SSL. Also, a pillar of the memory block BLK1 may be connected to bit lines BL1 to BL3. In FIG. 3A, a single memory block BLK1 may have two select lines GSL and SSL, eight (8) word lines WL1 to WL8, and three (3) bit lines BL1 to BL3, but an example embodiment thereof is not limited thereto.

Figure 3B:
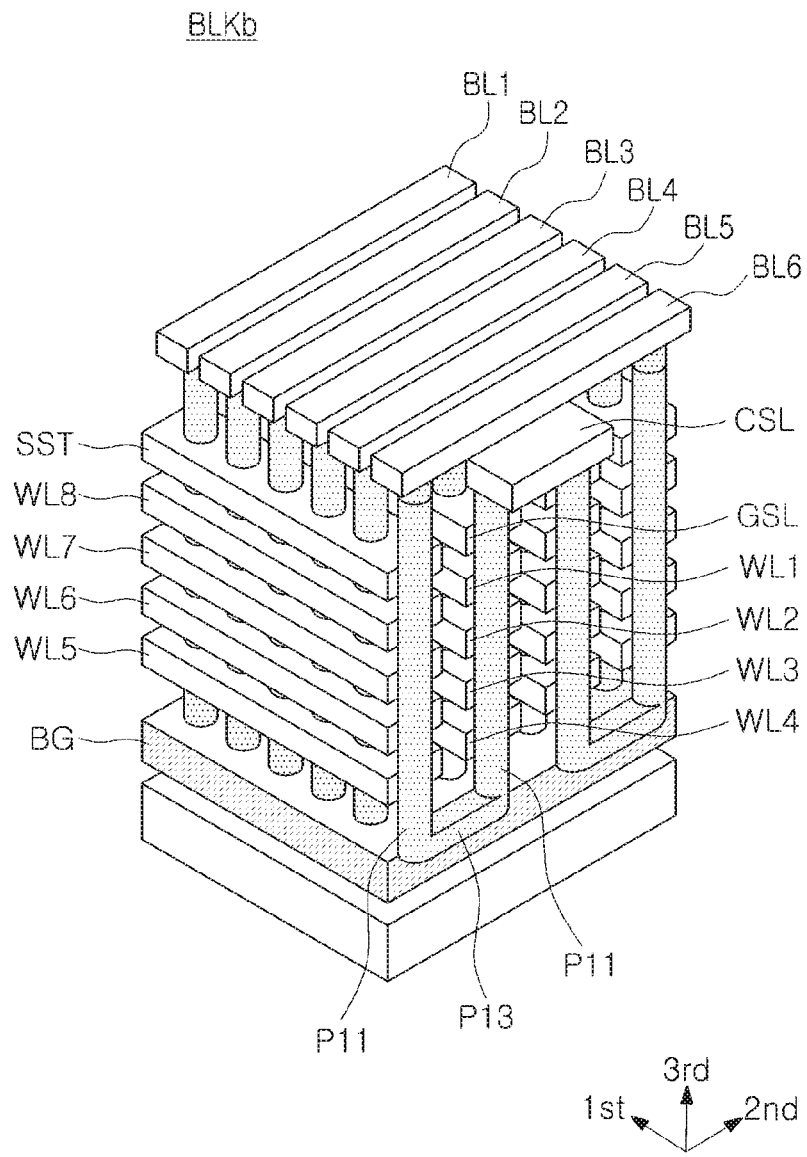

FIG. 3B is perspective diagram illustrating a memory block according to another embodiment of the inventive concept. Referring to FIG. 3B, it may be assumed that the number of layers of the word line is four (4) in a memory block BLKb for ease of description. The memory block BLKb may be implemented to have a bit cost scalable (BiCS) structure that pipes lower ends of adjacent memory cells connected to each other in series. The memory block BLKb may include strings NS of m×n (m and n are natural numbers).

Each string NS may include memory cells MC1 to MC8 connected in series. First upper ends of the memory cells MC1 to MC8 may be connected to the string select transistor SST, second upper ends of the memory cells MC1 to MC8 may be connected to the ground select transistor GST, and lower ends of the memory cells MC1 to MC8 may be piped to each other. Memory cells included in the string NS may be formed by being stacked on a plurality of semiconductor layers. Each string NS may include a first pillar PL11, a second pillar PL12, and a pillar connection part PL13 for connecting the first pillar PL11 to the second pillar PL12. The first pillar PL11 may be connected to the bit line (e.g., BL1) and the pillar connection part PL13, and may be formed by penetrating regions between the string select line SSL and the word lines WL5 to WL8. The second pillar PL12 may be connected to a common source line CSL and the pillar connection portion PL13 and may be formed by penetrating regions between the ground selection line GSL and the word lines WL1 to WL4. As illustrated in FIG. 3B, the string NS may be implemented in a U-shaped pillar shape.

In an example embodiment, the back-gate BG may be formed on the substrate, and the pillar connection portion PL13 may be implemented in the back-gate BC. In an example embodiment, the back-gate BG may be present in the block BLKb in common. The back-gate (BG) may be configured to be separated from a back-gate of another block.

Figure 4:
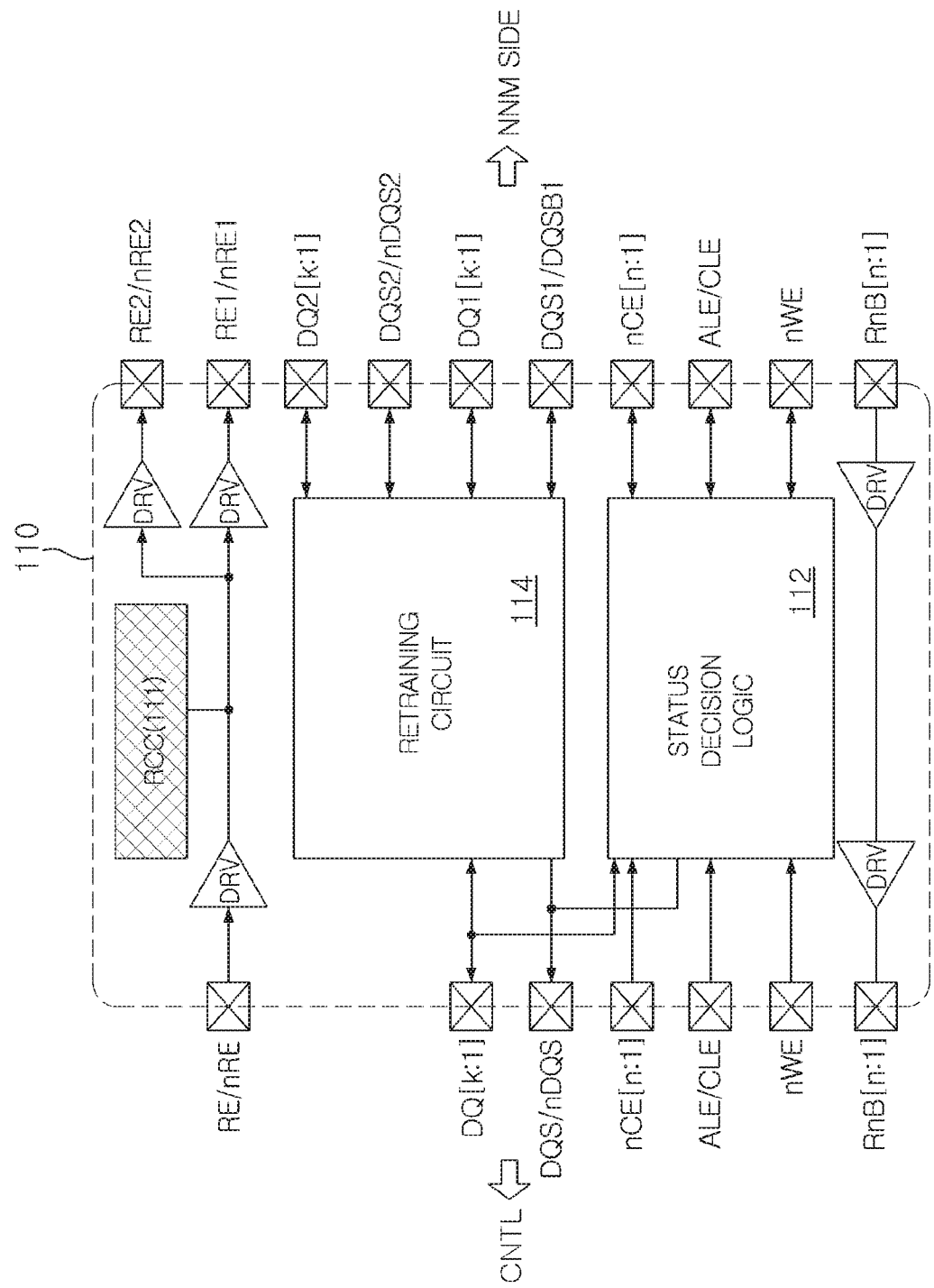
FIG. 4 is a diagram illustrating an interface chip according to embodiments of the inventive concept.

FIG. 4 is a block diagram further illustrating in one example the interface chip 110 according to example embodiments of the inventive concept. Referring to FIG. 4, the interface chip 110 may include a retraining checking circuit 111, a status decision logic 112 and a retraining circuit 114. In FIG. 4, it is assumed that the interface chip 110 is suitable as an interface for an NAND flash memory device.

The retraining checking circuit 111 may receive a read enable signal (RE/nRE), a data strobe signal (DQS/nDQS), a write command, or a read command, and may be implemented to determine whether a retraining operation is necessary through an unselected channel That is, the retraining checking circuit 111 may be activated using a read enable signal RE/nRE, a data strobe signal DQS/nDQS, a write command signal, or a read command signal. However, those skilled in the art will recognize that the retraining checking circuit 111 may be otherwise activated.

The status decision logic 112 may generate at least one selection signal that determines an operation mode (e.g., a receiving (RX) mode or a transmitting (TX) mode) for the retraining circuit 114 using at least one control signal (e.g., one or more of nCE[n:1], nRE, ALE/CLE, nWE, DQS/nDQS) and/or data signals (DQ[k:1], where 'n' and 'k' are integers greater than one).

The retraining circuit 114 may be implemented to select an operation mode in response to a select signal output from the status decision logic 112, and to adjust timings of data signals DQ[k:1] or data strobe signals DQS/nDQS suitable for the selected operation.

The retraining circuit 114 may include at least one clock-based sampler and a delay locked loop (DLL) circuit which generates a clock input to the sampler. Alternately, the retraining circuit 114 may include at least one clock-based sampler and delay cells which generates a clock input to the sampler. However, the retraining circuit 114 may be variously implemented to adjust signal timing(s).

In this regard, the retraining circuit 114 may be implemented to reduce training time by searching for a reference voltage using a self-training circuit. For example, the self-training circuit may reduce training time by simultaneously searching for respective reference voltages for NVM through different input and output pads of the NVM package 100.

The retraining circuit 114 may include a duty cycle correction circuit for addressing jitter caused by distortion of duty cycle of a DQS coming from the NVM. In this regard, the retraining circuit 114 may calibrate driving strength for the NVM using a Z-Q calibration.

Referring FIG. 4, connection relationship(s) between the pads of the exemplary layout may include the following. Data pads for inputting and outputting data signals DQ[k:1] may be connected to one of first internal data pads for inputting and outputting first internal data signals DQ1[k:1] and second internal data pads for inputting and outputting first internal data signals DQ1[k:1] through the retraining circuit 114. Data strobe pads through which data strobe signals DQS/nDQS are input and output may be connected to one of first internal data strobe pads for inputting and outputting the first data strobe signals DQS1/nDQS1 and second internal data strobe pads for inputting and outputting the second data strobe signals DQS2/nDQS2.

Pads which receive the read enable signals RE/nRE from the controller 200 may be connected to first read enable pads for outputting first read enable signals RE1/nRE1 and second internal read enable pads for outputting the second read enable signals RE2/nRE2 toward the non-volatile memory through output drivers.

The chip enable signals CE[n:1] may be simultaneously received in the interface chip 110 and the NVM through wire bonding.

Address latch enable/command latch enable pads which may receive an address latch enable signal/command latch enable signal ALE/CLE from the controller 200 may be connected to internal address latch enable/command latch enable pads outputting an address latch enable signal/command latch enable signal ALE/CLE toward the NVM through the status decision logic 112.

The write enable pad which may receive the write enable signal nWE from the controller 200 may be connected to an internal write enable for outputting the write enable signal (nEB) to the NVM through the status decision logic 112.

As illustrated in FIG. 4, the status decision logic 112 may transmit pass/failure information to the controller 200 using a DQ/DQS signal, and the status decision logic 112 may receive a read enable signal nRE.

The controller 200 may transmit a status read command to the status decision logic 112 using a data signal or a write enable signal DQ/nWE. Also, the controller 200 may transmit the read enable signal nRE to the status decision logic 112. The retraining checking circuit 113 may latch the status read data using the read enable signal nRE and may transmit the status read data to the controller 200 through the data signal or data strobe signal DQ/DQS.

The status read data may be divided into the interface chip 110 status read data and NAND status read data.

The status read data may be selected as one of interface chip status read data and NAND status read data. The interface chip status read data in the example embodiment may include a result value of determination of the retraining checking circuit 111.

Those skilled in the art will recognize that the connection relationship(s) for the pads illustrated in relation to the interface chip 110 of FIG. 4 are merely exemplary.

Figure 5:
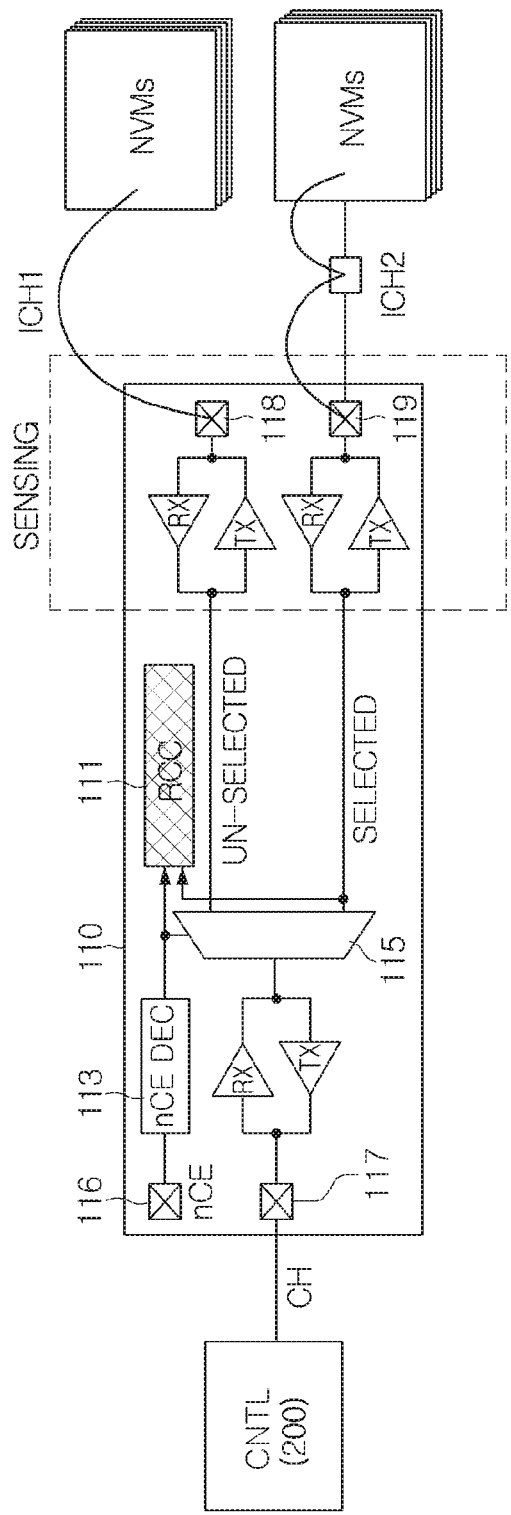
FIG. 5 is a diagram illustrating a retraining check of an interface chip according to embodiments of the inventive concept.

FIG. 5 is a block diagram further illustrating in one example the interface chip 110 according to embodiments of the inventive concept.

Referring to FIG. 5, the interface chip 110 may include at least one chip enable pad 116, data pads 117 corresponding to a channel CH between a controller 200 and the interface chip 110, first data pads 118 corresponding to a first internal channel ICH1, and second data pads 119 corresponding to a second internal channel ICH2. Here, for ease of description, the first internal channel ICH1 is assumed to be the unselected channel and the second internal channel ICH2 is assumed to be the selected channel.

A retraining checking circuit (RCC) 111 may be activated by receiving chip selection information from a chip enable signal decoder 113, and at least one operation information from the selected channel ICH2. The operation information may be related to a write operation (or program operation), an erase operation and/or a read operation.

The retraining checking circuit 111 may transmit test data to the data pads 118 using a transmission path corresponding to an unselected channel (e.g., the first internal channel ICH1), may receive test data from the data pads 118 using a reception path corresponding to the selection channel ICH1, and may determine whether retraining is necessary. The sensing portion of the retraining checking circuit 111 may be related to a transmission path and a reception path of the unselected channel ICH1.

An internal channel selector 115 may determine whether to connect the channel (CH) to the first internal channel (ICH1) or the second internal channel ICH2 based on the chip selection information from the chip enable signal decoder 113.

The interface chip 110 may be used to check whether retraining for the unselected path is necessary using the retraining checking circuit 111 while the selected channel continues to be used for the execution of normal operations (e.g., read operation, write operation and/or erase operation). Also, the interface chip 110 may be used to transmit information on whether retraining is necessary to the controller 200 through a status read or via a dedicated pin. Accordingly, the interface chip 10 may automatically respond to changes in timing caused by variations in frequency, voltage, temperature, and the like.

In certain embodiments, the retraining checking circuit 111 may be implemented as a built-in self test (BIST) circuit or a DQS oscillator.

Figure 6:
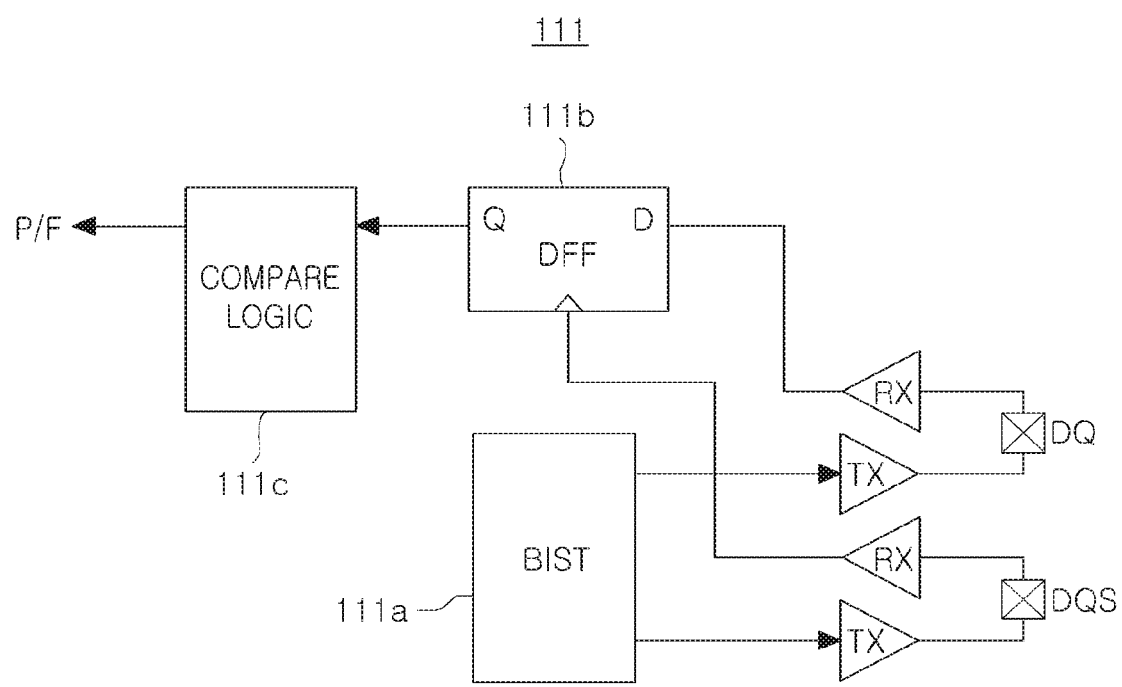
FIG. 6 is a diagram illustrating operation of a retraining checking circuit implemented as a BIST circuit.

FIG. 6 is a block diagram illustrating in one example the retraining checking circuit 111, as implemented with a BIST circuit 111*a*. Referring to FIG. 6, the retraining checking circuit 111 may check pass/failure using matching between a DQ signal and a DQS signal output from the BIST circuit 111*a*. For example, a flip-flop (DFF) 111*b* may be used to latch the data signal DQ from the data strobe pad to a data pad in response to the data strobe signal DQS. Comparison logic 111*c* may receive a latch value from the flip flop 111*b* and output a pass/failure signal corresponding to the need for a retraining operation. The retraining checking circuit 111 may generate pass/failure signals according to the matching of the DQ signal and the DQS signal after passing the DQ signal and the DQS signal generated in the BIST circuit 111*a* through a transmission path and a reception path.

Figure 7:
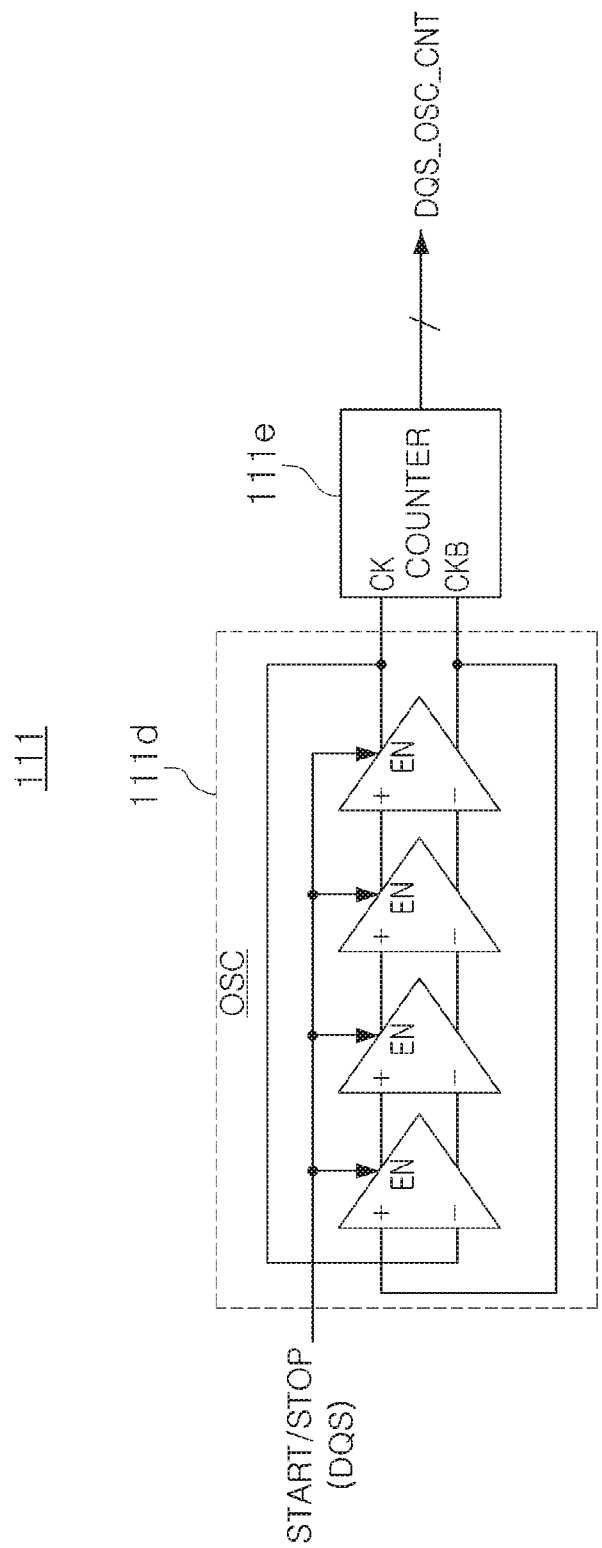
FIG. 7 is a diagram illustrating operation of a retraining checking circuit implemented as an oscillator.

FIG. 7 is a block diagram illustrating in one example the retraining checking circuit 111 as implemented with an oscillator 111*d*. Referring to FIG. 7, a count value DQS_OSC_CNT according to input and output of a DQS signal may be output through the unselected channel with respect to a clock output from the oscillator 111*d*. The retraining checking circuit 111 may generate a pass/failure signal using the output count value DQS_OSC_CNT provided by a counter 111*e*.

As noted above, the retraining checking circuit 111 may be variously activated. For example, the retraining checking circuit 111 may be activated using a read enable signal nRE.

Figure 8:
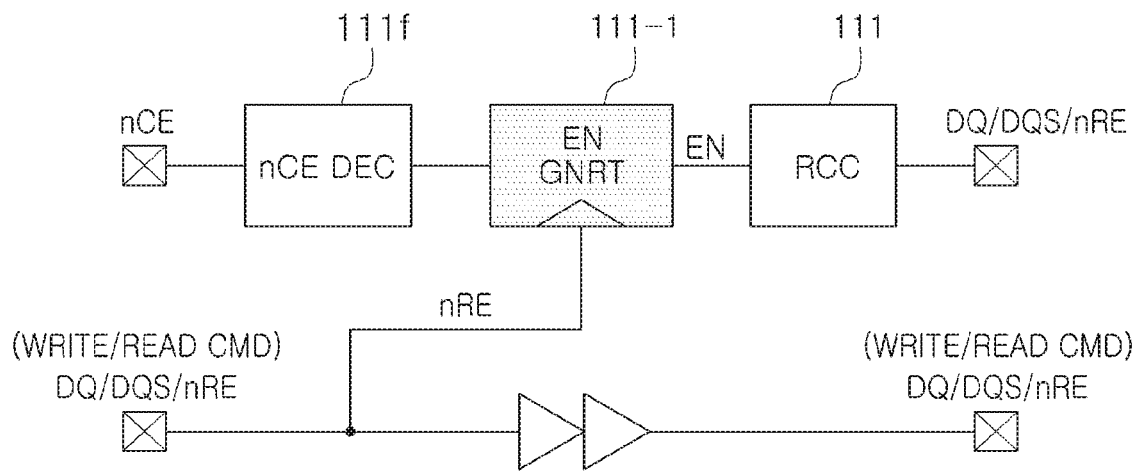
FIG. 8 is a diagram illustrating an activation process of a retraining checking circuit RCC using a DQ/DQS/nRE signal according to embodiments of the inventive concept.

FIG. 8 is a block diagram illustrating one approach to the activation of the retraining checking circuit (RCC) 111 using a DQ/DQS/nRE (or a write/read command) signal. Referring to FIG. 8, an activation signal generator RCC EN GNRT 111-1 may receive chip selection information from a chip enable signal decoder 111*f*, and may output an activation signal EN in response to a read enable signal nRE. The activation signal EN may be used to activate the retraining checking circuits (RCC) 111. For example, when the chip selection information is unselected and the read enable signal nRE is at a high level, the activation signal generator 111-1 may output the activation signal EN to check whether retraining for the unselected channel is necessary.

Alternately, the activation signal generator in the example embodiment may also output the activation signal EN in response to a write or read command signal instead of the read enable signal nRE.

The retraining checking circuit RCC illustrated in FIG. 8 may be activated non-periodically in response to the read enable signal nRE. However, an example embodiment thereof is not limited thereto.

Figure 9:
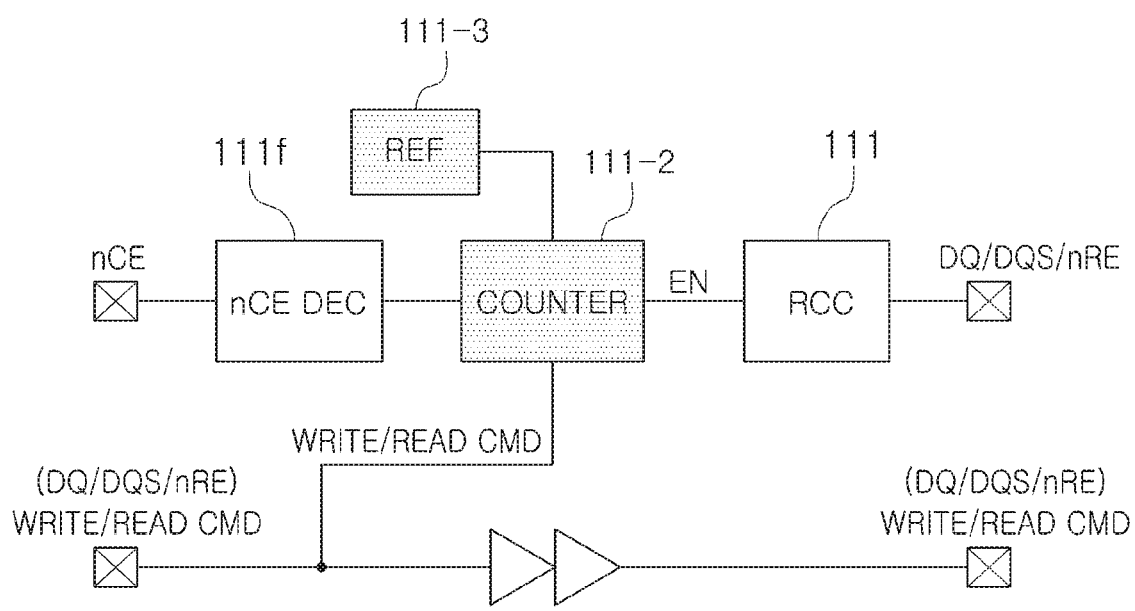
FIG. 9 is a diagram illustrating an activation process of a retraining checking circuit RCC using a write/read command signal according to embodiment of the inventive concept.

FIG. 9 is a block diagram illustrating another approach to the activation of the retraining checking circuit RCC 111 using a write/read command (or DQ/DQS/nRE). Referring to FIG. 9, the counter 111-2 may output an activation signal EN by counting a write or read command signal and comparing the counted value with a reference value. The reference value may be stored in a reference value storage 111-3. In an example embodiment, the reference value store 111-3 may be implemented as a volatile or non-volatile memory. For example, when the write command signal or read command signal is counted 1000 times, the retraining checking circuit may check whether retraining is necessary.

The retraining checking circuit in the example embodiment may output an activation signal by counting the read enable signal nRE instead of a write or read command signal, and comparing the counted value with a reference value.

The retraining checking circuit RCC 111 may be implemented using an internal oscillator or using nRE/RE or DQS/nDQS.

Figure 10:
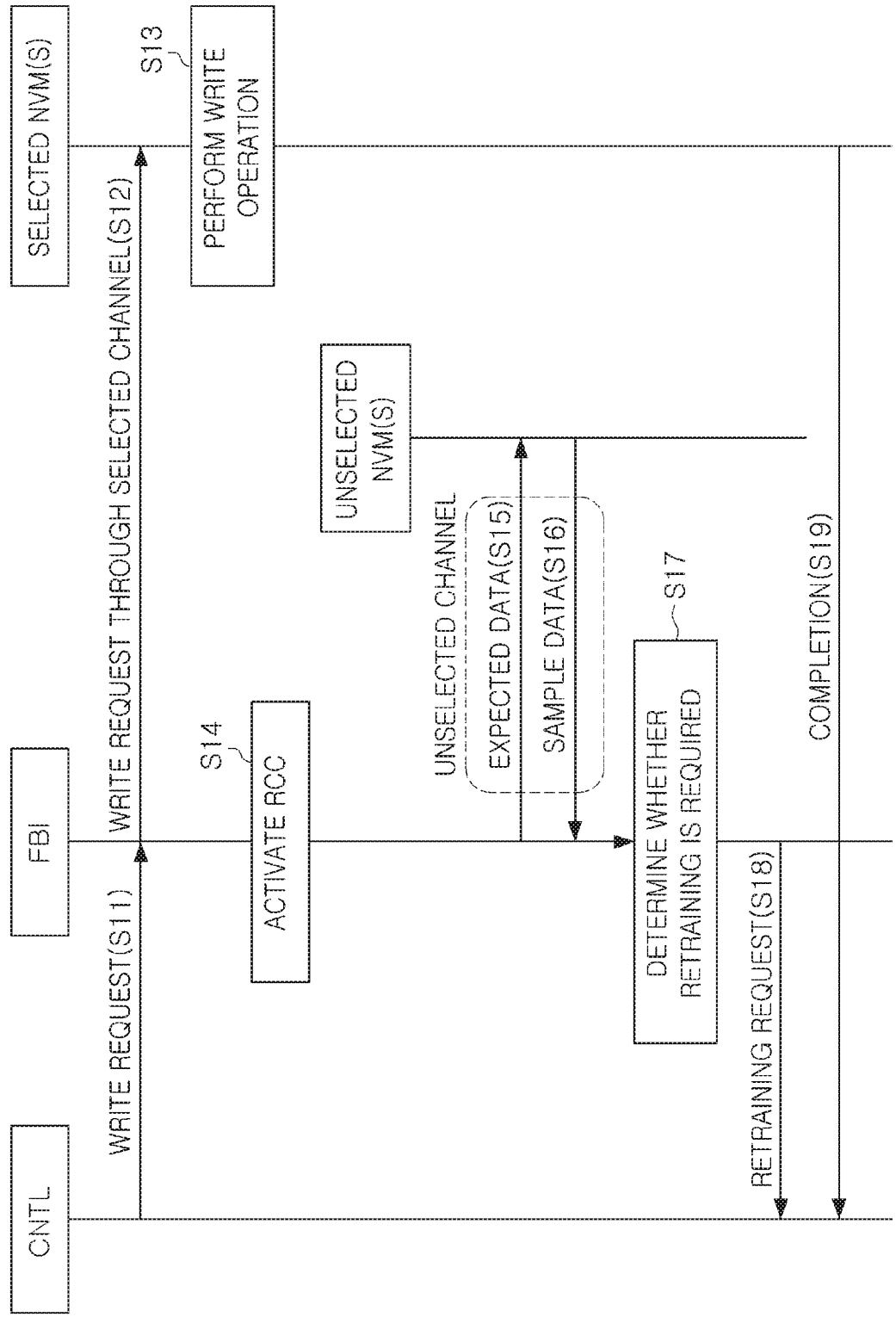
FIG. 10 is a ladder diagram illustrating an operation of retraining check of a storage device according to embodiments of the inventive concept.

FIG. 10 is a conceptual (a ladder flow) diagram illustrating the execution of a retraining checking operation in the storage device 10 of FIG. 1.

Referring to FIGS. 1 and 10, the controller 200 may transmit a write request to the interface chip 110 (S11). The write request may include a write command, a write address, and write data. An interface chip 110 may transmit the write request received from the controller 200 to selected NVM through the selected channel (S12). Thereafter, the selected NVM may perform a write operation corresponding to the write request (S13).

While the write operation is performed, the interface chip 110 may activate the retraining checking circuits (RCC) 111 (S14). Thereafter, the retraining checking circuit 111 may transmit expected data via to unselected NVM through the unselected channel (S15), and may receive sampling data corresponding to the unselected NVM through an unselected channel (S16). The retraining checking circuit 111 may determine whether retraining is necessary by comparing expected data with the sampling data (S17). When retraining is necessary, the retraining checking circuit 111 may transmit a retraining request to the controller 200 (S18).

Then, the selected NVM may complete the write operation and transmit completion information to the controller 200 (S19).

Of note, the retraining checking operation of FIG. 10 may be performed simultaneously with the execution of the write operation.

Figure 11:
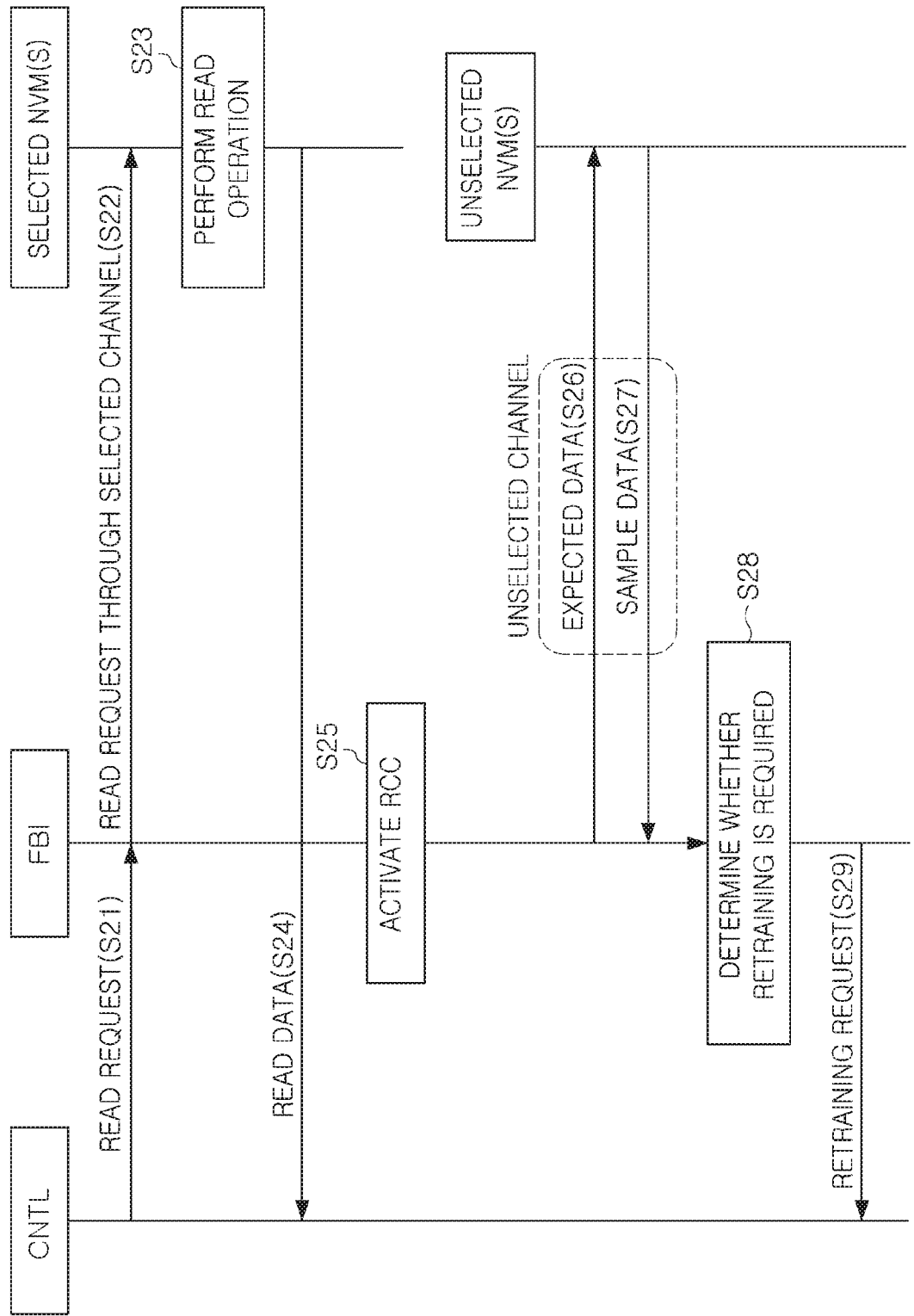
FIG. 11 is a ladder diagram illustrating an operation of retraining check of a storage device according to embodiments of the inventive concept.

FIG. 11 is another conceptual diagram illustrating the execution of a retraining checking operation in the storage device 10 of FIG. 1.

Referring to FIGS. 1 and 11, the controller 200 may transmit a read request to an interface chip 110 (S21). The read request may include a read command and a read address. The interface chip 110 may transmit the read request received from the controller 200 to the selected NVM through a selected channel (S22). Thereafter, the selected NVM may perform a read operation corresponding to the read request (S23). Then, the NVM may transmit the read data to the controller 200 (S24).

While the read operation is performed, the interface chip 110 may activate the retraining checking circuits (RCC) 111 (S26). Thereafter, the retraining checking circuit 111 may transmit expected data to the unselected NVM through the unselected channel (S26), and may receive corresponding sampling data from the unselected non-volatile memory device(s) through the unselected channel (S27). The retraining checking circuit 111 may determine whether retraining is necessary by comparing expected data with sampling data (S28). When retraining is necessary, the retraining checking circuit 111 may transmit a retraining request to the controller 200 (S29).

Of note, the retraining checking operation of FIG. 11 may be performed simultaneously with the execution of the read operation.

Figure 12:
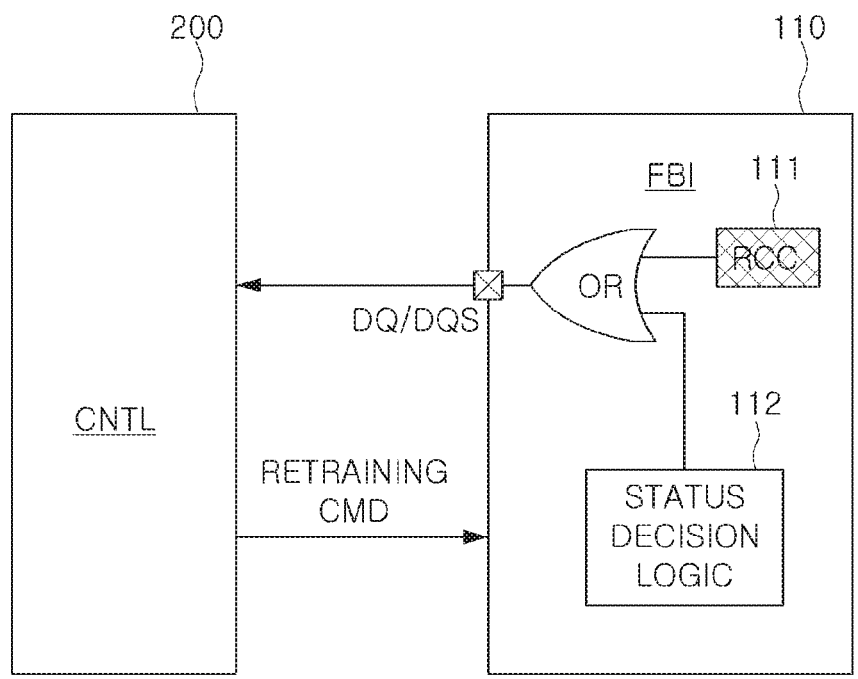
FIG. 12 is a diagram illustrating a method of transmitting a retraining request of an interface chip to a controller according to embodiments of the inventive concept.

FIG. 12 is a block diagram illustrating one approach to the transmitting of a retraining request from the interface chip 110 to a controller 200. Referring to FIG. 12, a request for retraining may be transmitted using a status read operation. That is, a status read operation may be performed in response to a status read command provided by the controller 200. Alternately, the status read operation may be performed in the NVM connected to the unselected channel in response to at least one operation signal in relation to a normal operation executed using the selected channel.

The interface chip 110 may transmit a result value obtained by OR-calculating a pass/failure result value provided by the retraining checking circuit (RCC) 111 with a state value provided by status decision logic (e.g., state determination logic) 112 to the controller 200 as status read information. In an example embodiment, the status read information may include at least one of status read information in relation to an interface chip and status read information in relation to a non-volatile memory. The controller 200 may issue a retraining command in response to the status read information received from the interface chip 100, and may transmit the retraining command to the interface chip 110.

Figure 13:
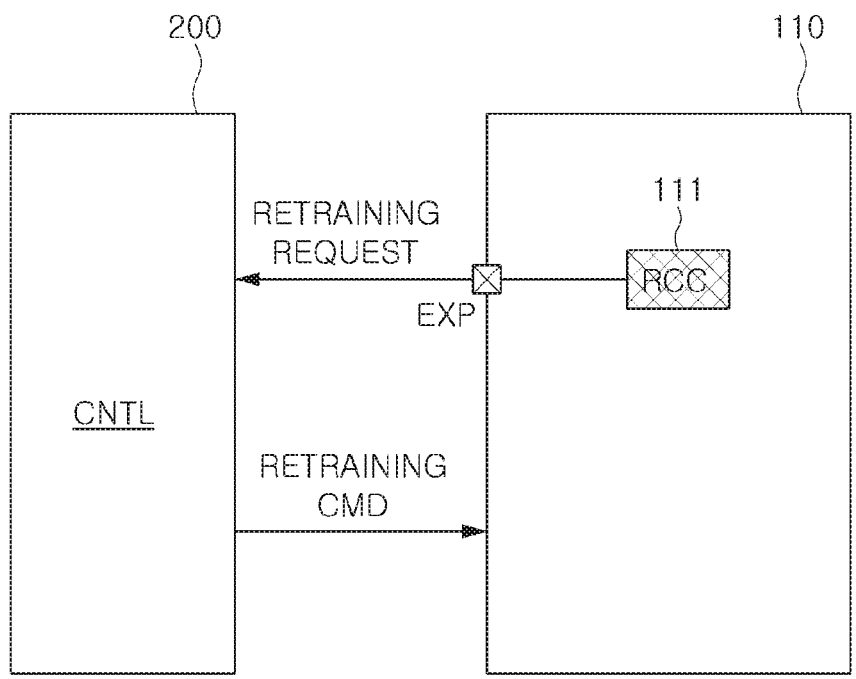
FIG. 13 is a diagram illustrating a method of transmitting a retraining request of an interface chip to a controller according to embodiments of the inventive concept.

FIG. 13 is a block diagram illustrating another approach to the transmitting of a retraining request from the interface chip 110 to a controller 200. Referring to FIG. 13, the interface chip 110 may transmit a retraining request corresponding to the unselected channel to a controller 200 via a dedicated pin (EXP). The retraining request may include a pass/failure result value of a retraining checking circuit (RCC) 111. The controller 200 may transmit a retraining command to the interface chip 110 in response to a retraining request received through the pin EXP.

As noted above, the NVM package 100 of certain embodiments of the inventive concept may include vertically stacked NVM. One example of this variation is illustrated in the block diagram of FIG. 14.

Figure 14:
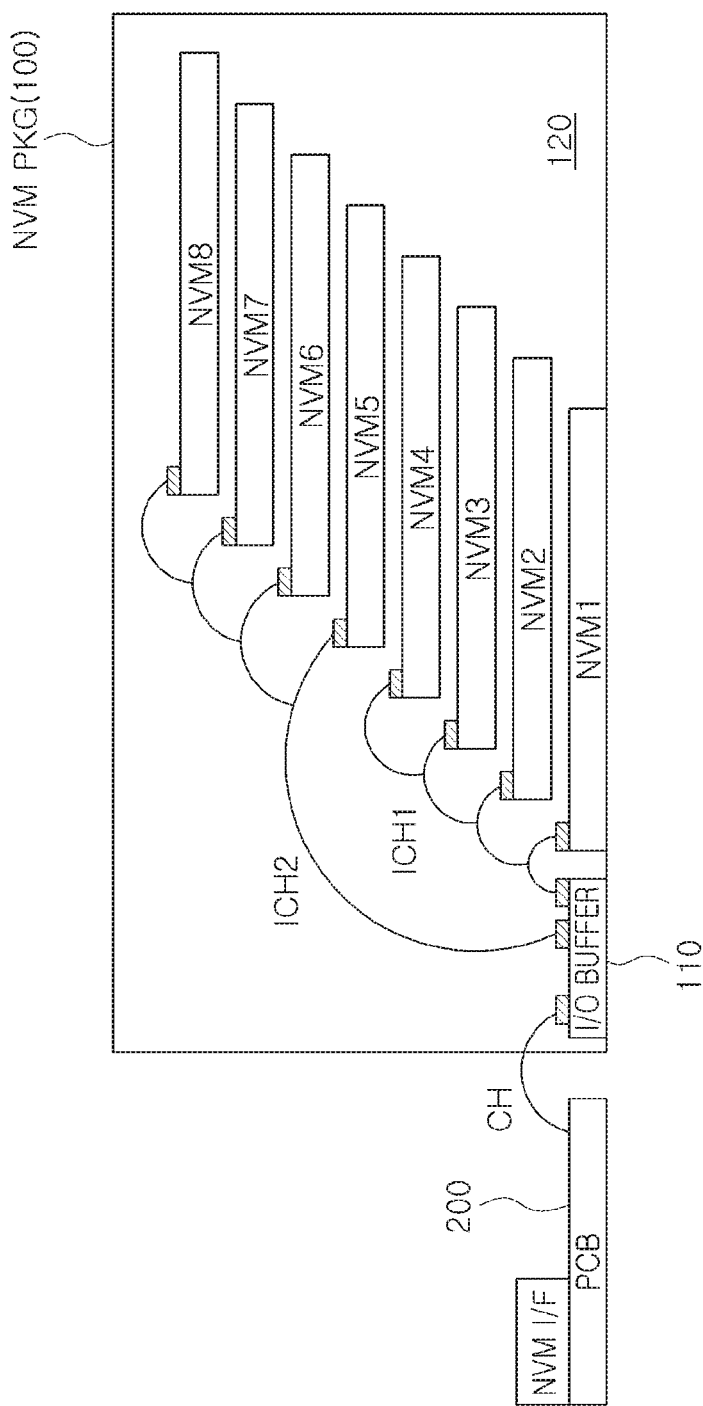
FIG. 14 is a diagram illustrating a non-volatile memory package 100 implemented as a stacked-type non-volatile memory package according to embodiments of the inventive concept.

Referring to FIG. 14, the NVM package (NVM PKG) 100 includes the interface chip 110 and vertically stacked NVM (e.g., NVM1 through NVM 8) 120. The first internal channel ICH1 may respectively connect first stacked NVM (e.g., NVM1 to NVM4) with the interface chip 110, and the second internal channel ICH2 may respectively connect second stacked NVM (e.g., NVM5 to NVM8) to the interface chip 110.

The interface chip 110 of FIG. 14 is shown physically adjacent to a lowermost one of the stacked NVM 120 (e.g., NVM1). However, the interface chip 110 may be disposed between the first stacked NVM and the second stacked NVM, or adjacent to an uppermost one of the stacked NVM (e.g., NM8).

The first and second internal channels ICH1 and ICH2 illustrated in FIG. 14 may be implemented, at least on part, using wire channels.

However, those skilled in the art will recognize that the foregoing examples are merely exemplary.

Figure 15:
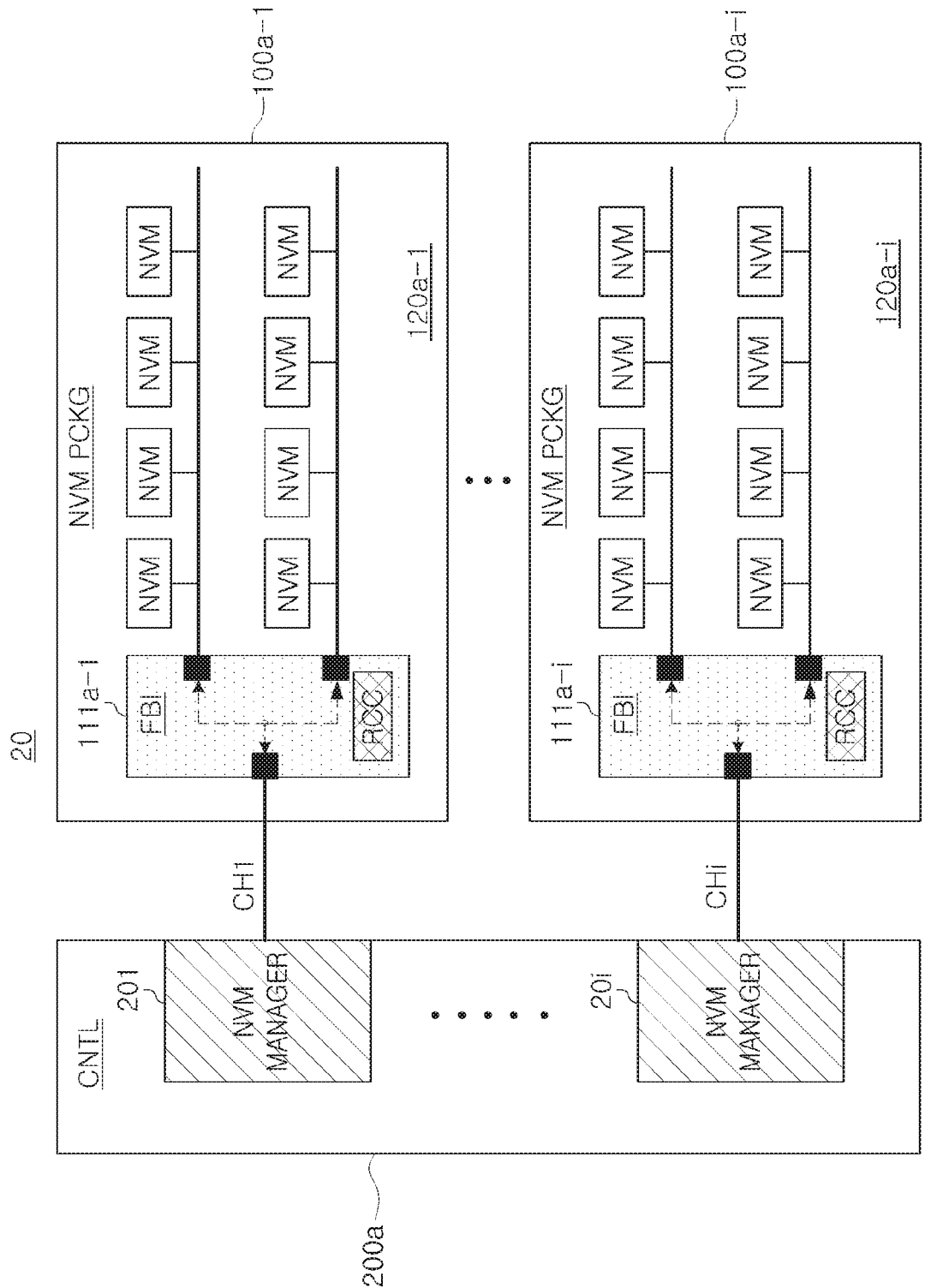
FIG. 15 is a diagram illustrating a storage device according to embodiments of the inventive concept.

FIG. 15 is a block diagram illustrating a storage device 20 according to embodiments of the inventive concept. Referring to 15, the storage device 20 may include a plurality of NVM memory packages (e.g., 100a-1 to 100a-i, where 'i' is an integer greater than one) and a controller 200a for variously controlling the NVM packages 100a-1 to 100-i.

Here, the first NVM package 100a-1 may be connected to a memory controller 200a by the first internal channel CH1, similarly to the embodiment illustrated in FIG. 1. And in like manner, each of the remaining NVM packages 100a-i may be connected to the controller 200a by a corresponding internal channel CHi.

Each of the NVM packages 100a-1 and 100a-i may be implemented to include a retraining checking circuit RCC 111, as described in relation to the embodiments of FIGS. 1 to 14. Accordingly, each of the NVM packages 100a-1 and 100a-i may be operated according to a method enabled by the retraining checking circuit RCC 111 in its various embodiments.

In certain embodiments of the inventive concept, the memory controller 200a may include a plurality of NVM memory managers 201 to 20i, each of which may be used to independently control a corresponding NVM package 100a-1 to 100a-i, respectively including a plurality of NVM 120a-1 to 120a-i.

Figure 16:
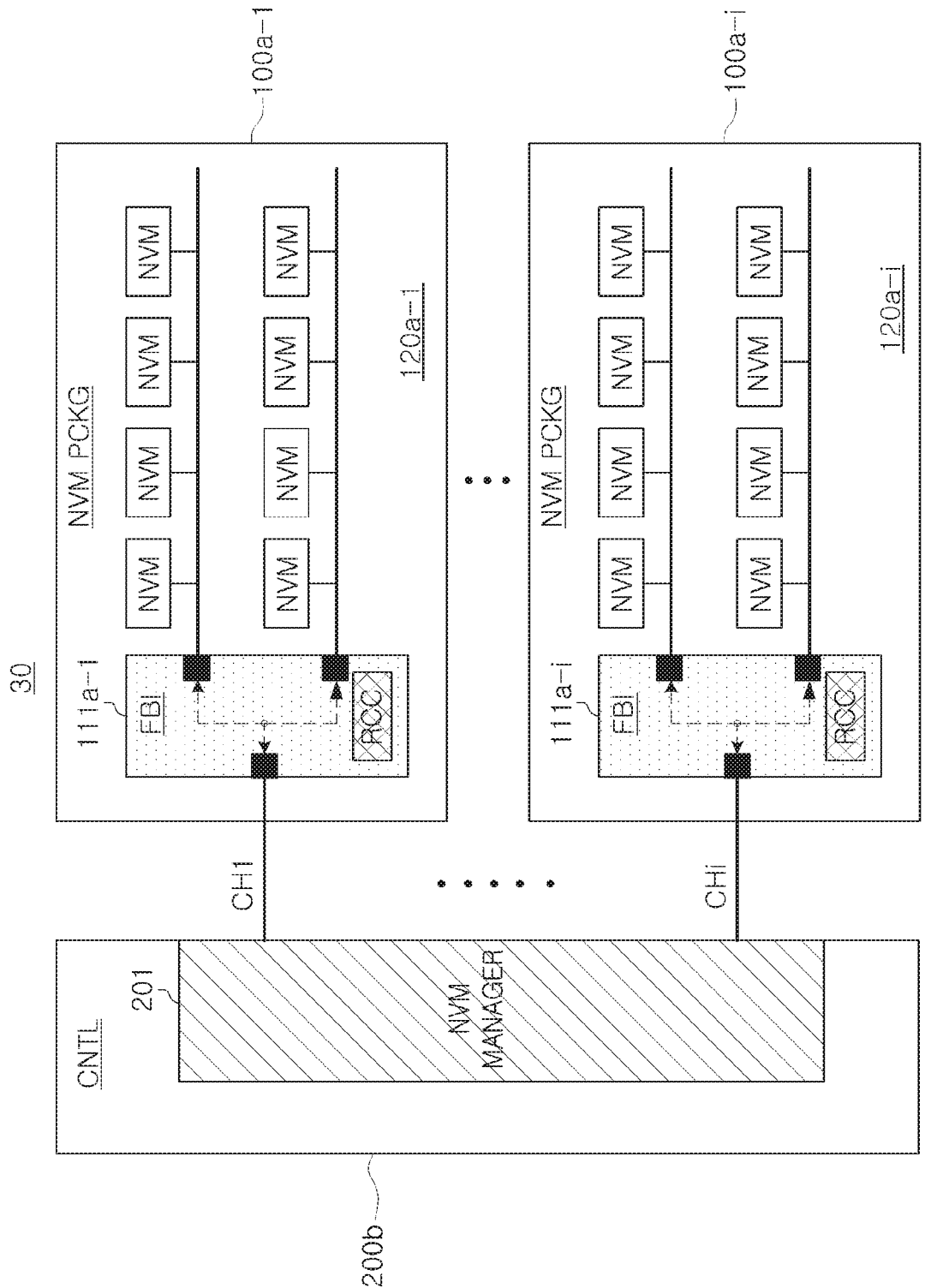
FIG. 16 is a diagram illustrating a storage device according to embodiments of the inventive concept.

In this regard, separate circuits (as shown in FIG. 15) may be used to respectively implement the NVM managers 201 to 20i, or a single controller (or processor) 201 and related software/firmware may be used to implement the functionality of individual NVM managers 201 to 20i (as shown in FIG. 16).

In the embodiments variously illustrated in FIGS. 1 to 16, channel branching may be performed using a single-layer interface chip 110. However, the inventive concept is not limited thereto, and channel branching may be performed using multi-layer interface chips.

Figure 17:
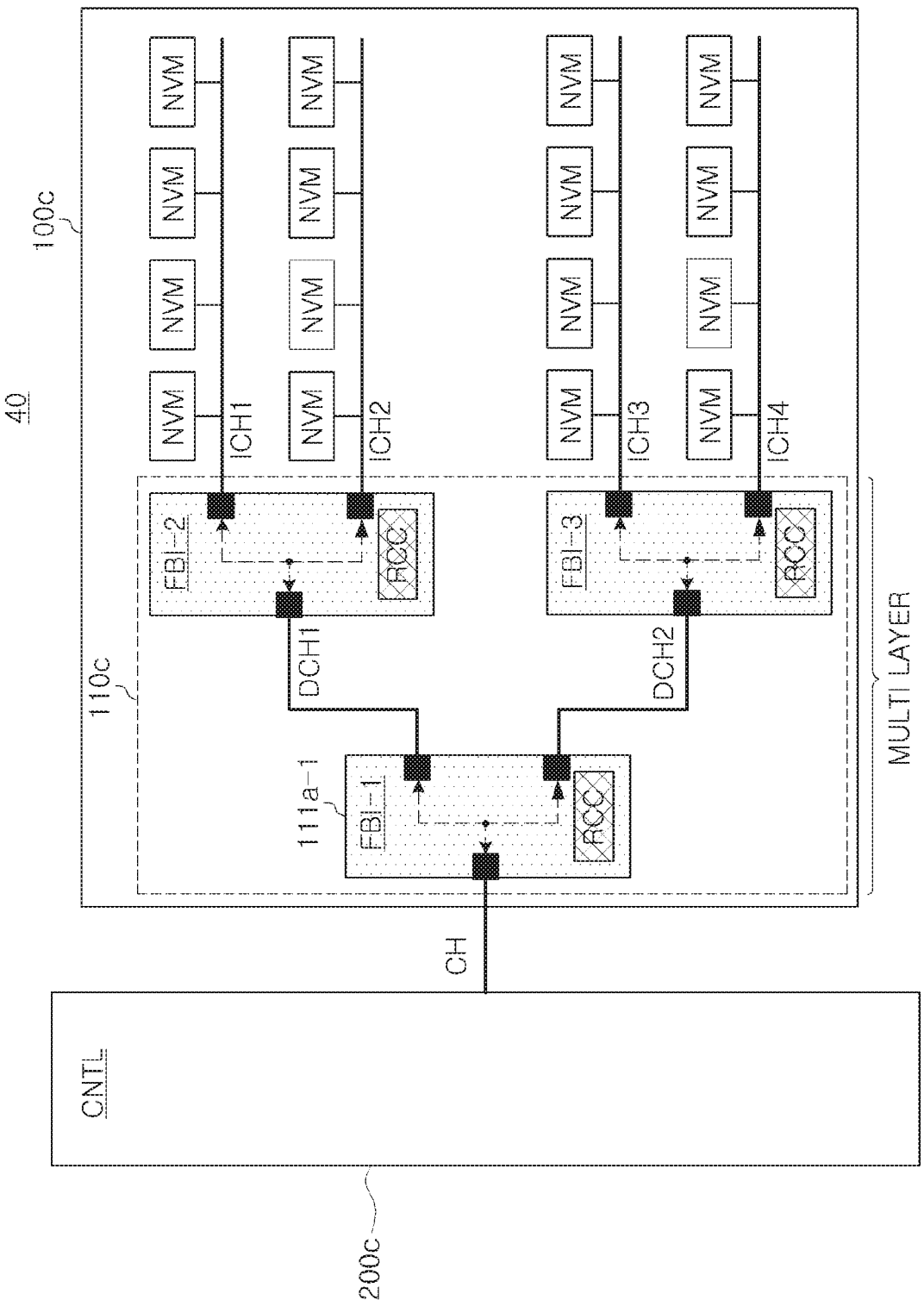
FIG. 17 is a diagram illustrating a storage device according to embodiments of the inventive concept.

FIG. 17 is a block diagram illustrating a storage device 40 according to embodiments of the inventive concept. Referring to FIG. 17, the storage device 40 may include a NVM package 100c and a controller 200c configure to control the NVM package 100c.

The NVM package 100c may include an interface circuit 110c including multi-layer interface chips (e.g.,) FBI-1, FBI-2, and FBI-3 and a plurality of NVM connected via first through fourth internal channels ICH1 to ICH4, respectively.

The interface circuit 110c may include a first interface chip FBI-1 of a first layer and second and third interface chips FBI-2 and FBI-3 of a second layer. The first interface chip FBI-1 may branch the first channel CH1 into two branch channels DCH1 and DCH2. The second and third interface chips FBI-2 and FBI-3 may be branched into two internal channels ICH1 and ICH2 or ICH3 and ICH4 corresponding to the branch channels DCH1 and DCH2, respectively.

In an example embodiment, the first, second, and third interface chips FBI-1, FBI-2, and FBI-3 may be implemented in the same manner In an example embodiment, each of the first, second, and third interface chips FBI-1, FBI-2, and FBI-3 may include a circuit for checking whether a retraining operation is necessary and a retraining checking circuit RCC implementing the operation, described with reference to FIGS. 1 to 14.

The controller 200c may command a retraining operation to a corresponding channel in response to a retraining request received from at least one of the first, second, and third interface chips FBI-1, FBI-2, and FBI-3.

Figure 18:
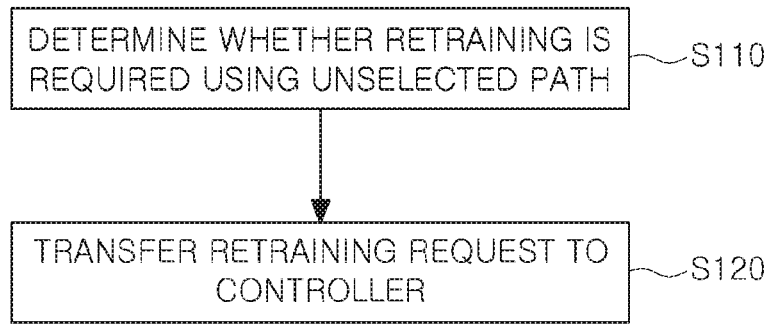
FIG. 18 is a flowchart summarizing a method of operation for an interface chip according to embodiments of the inventive concept.

FIG. 18 is a flowchart summarizing a method of operating an interface chip according to embodiments of the inventive concept. Referring to FIGS. 1 and 18, an interface chip 110 may operate as follows. The interface chip 110 may determine whether a retraining operation is necessary using an unselected channel in a normal mode (S110). And when a retraining operation is necessary, the interface chip 110 may transmit a retraining request to the controller 200 using a status read pin or a special pin.

In certain embodiments, the interface chip 110 may transmit a write request or a read request to a corresponding NVM using a selected channel.

Here, the determining of whether retraining is necessary may include activating a retraining checking circuit in response to a read enable signal, outputting expected data to an unselected channel, receiving sample data from the unselected channel, comparing the expected data with the sample data, and generating the retraining request according to a result of the comparison.

Alternately, the determining of whether retraining is necessary may include counting a DQS signal of an unselected channel, comparing a counted value with a reference value, and generating the retraining request according to a result of the comparison.

Here, the transmitting of the retraining request to the controller may include OR-calculating a status read value corresponding to a status read command and a retraining request corresponding to a result of the determination and transmitting the calculated value to the controller.

Alternately, the transmitting of the retraining request to the controller may include transmitting the retraining request corresponding to a result of the determination to the controller through at least one dedicated pin.

Figure 19:
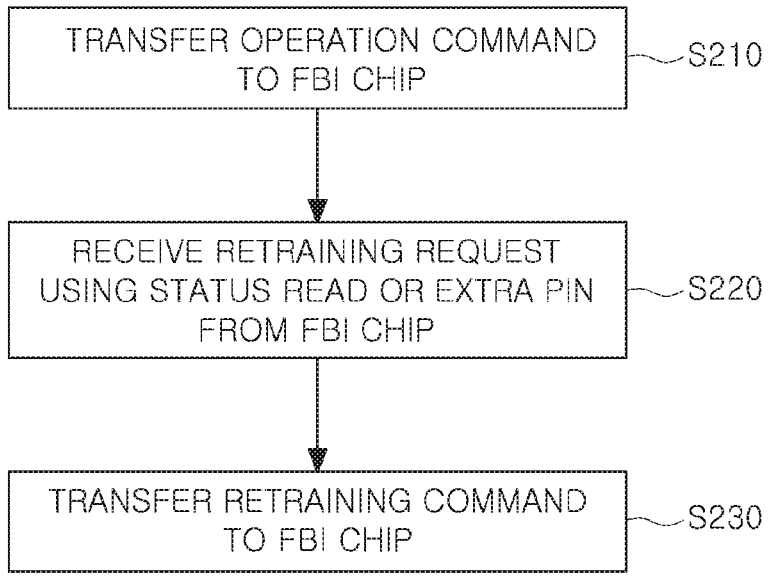
FIG. 19 is a flowchart summarizing a method of operation for a controller according to embodiments of the inventive concept.

FIG. 19 is another flowchart summarizing a method of operating a controller according to embodiments of the inventive concept. Referring to FIGS. 1 and 19, the controller 200 may operate as follows. The controller 200 may transmit an operation command to the interface chip (FBI Chip) 110. The operation command may be a write command or a read command (S210). Thereafter, the controller 200 may receive a retraining request from the interface chip through a status read pin or a special pin (S220). The controller 200 may transmit a retraining command to the interface chip in response to the received retraining request (S230).

Figure 20:
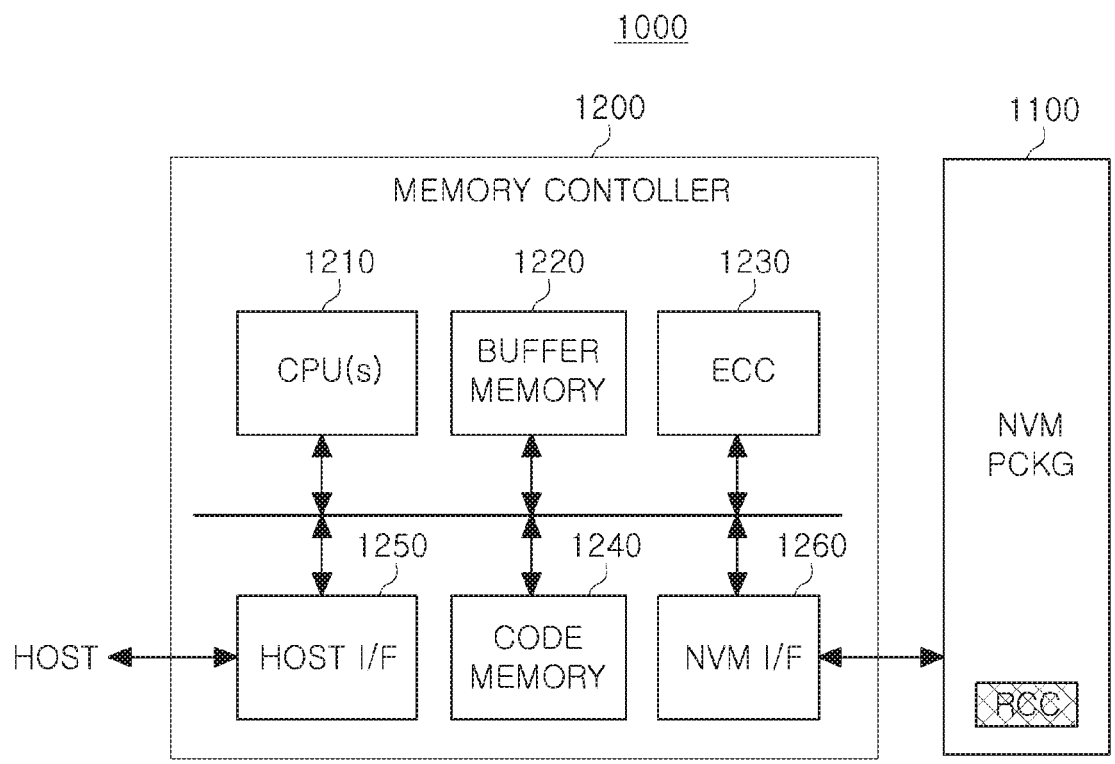
FIG. 20 is a diagram illustrating a storage device according to embodiments of the inventive concept.

FIG. 20 is a block diagram illustrating a storage device 1000 according to embodiments of the inventive concept. Referring to FIG. 20, the storage device 1000 may include at least one NVM package (NVM PCKG) 1100 and a memory controller 1200.

The non-volatile memory package 1100 may be implemented to perform the retraining checking operation and the retraining operation described with reference to FIGS. 1 to 19 to improve data reliability. Also, the non-volatile memory package 1100 may include at least one retraining checking circuit (RCC) for determining whether retraining is necessary. In an example embodiment, the non-volatile memory device may be implemented to be provided with an external high voltage (Vpp) optionally.

The memory controller 1200 may be connected to the non-volatile memory package 1110. The memory controller 1200 may include at least one processor (CPU(s)) 1210, a buffer memory 1220, an error correction circuit 1230, a code memory 1240, a host interface 1250, and a non-volatile memory interface (1260).

The processor 1210 may be implemented to control overall operations. The processor 1210 may be implemented by a central processing unit (CPU) or an application processor (AP).

The buffer memory 1220 may be implemented to temporarily store data necessary for operation of the memory controller 1200. Although the buffer memory 1220 illustrated in FIG. 20 is disposed in the memory controller 1200, an example embodiment thereof is not limited thereto. The buffer memory 1220 in the example embodiment may be disposed as a separate intellectual property (IP) outside the memory controller 1200.

The error correction circuit 1230 may calculate an error correction code value of data to be programmed in a write operation, and may correct an error of data read in a read operation based on the error correction code value, and may correct an error of data recovered from the non-volatile memory package 1100 in a data recovery operation. The error correction circuit 1230 may correct an error using coded modulation such as a low density parity check (LDPC) code, a BCH code, a turbo code, a reed-Solomon code, a convolution code, a recursive systematic code (RSC), trellis-coded modulation (TCM), a block coded modulation (BCM), or the like. The code memory 1240 may store code data required to operate the memory controller 1200. The code memory may be implemented as a non-volatile memory device.

The host interface 1250 may be implemented to provide a function of interfacing with an external device. The non-volatile memory interface 1260 may be implemented to provide a function of interfacing with the non-volatile memory package 1100. Although not illustrated, the memory controller 1200 may include a wireless communication function (e.g., Wi-Fi).

The storage device 1000 in the example embodiment may periodically or non-periodically perform a retraining operation on an unselected channel while performing a normal operation through a selected channel such that performance of a system may improve.

Figure 21:
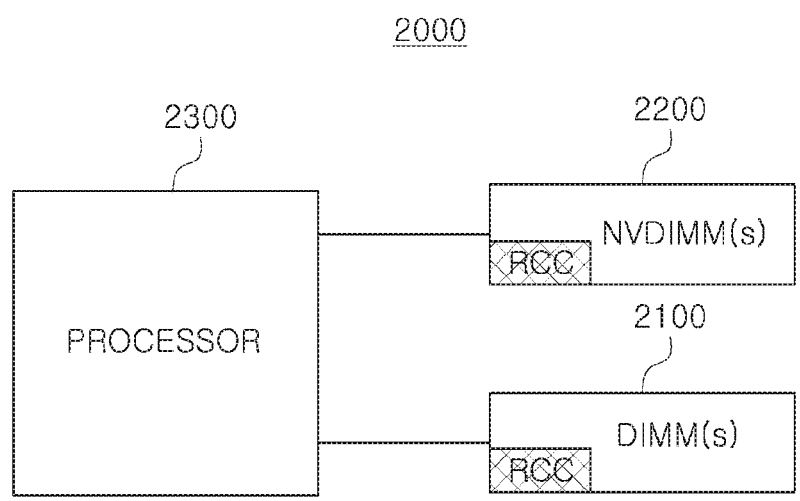
FIG. 21 is a block diagram illustrating a computing system according to embodiments of the inventive concept.

FIG. 21 is a block diagram illustrating a computing system 2000 according to embodiments of the inventive concept. Referring to FIG. 21, the computing system 2000 may include at least one memory module (DIMM) 2100, at least one non-volatile memory module (NVDIMM) 2200, and at least one processor 2300. Each of the at least one memory module 2100 and the at least one non-volatile memory module 1200 may include a retraining checking circuit (RCC) which may perform the retraining checking operation described above.

The example embodiment may be applicable to various types of computing systems (e.g., a central processing unit (CPU)/a graphic processing unit (GPU)/a neural processing unit (NPU) platform).

Figure 22:
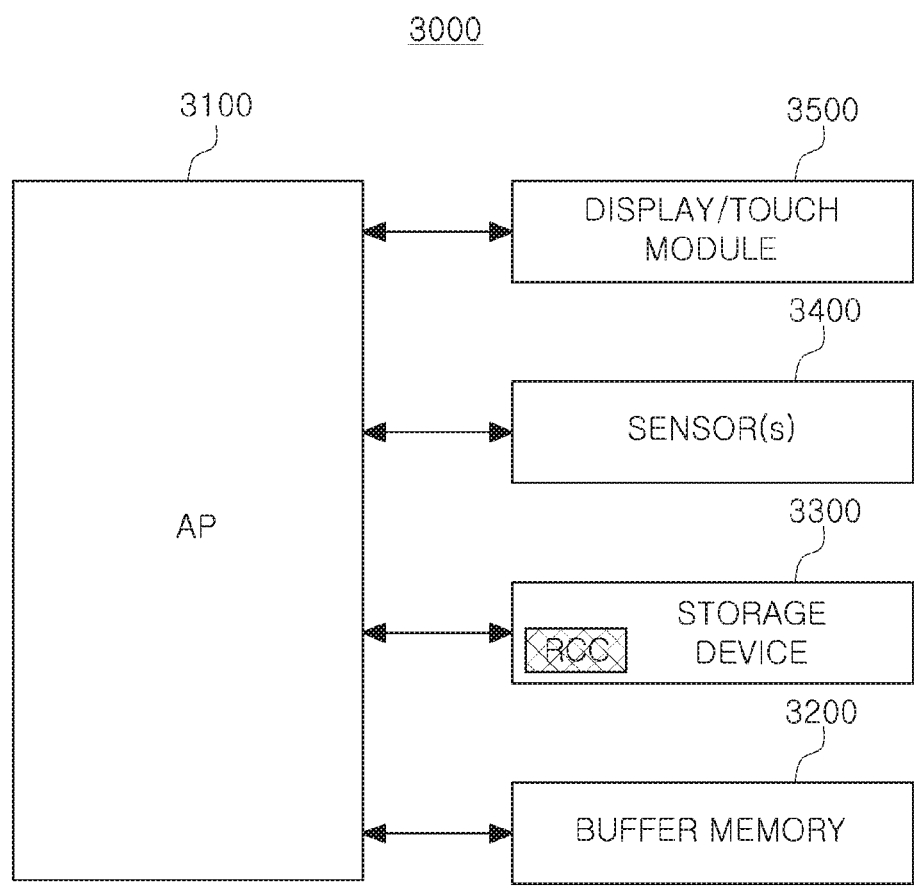
FIG. 22 is a diagram illustrating a mobile device according to embodiments of the inventive concept.

FIG. 22 is a block diagram illustrating a mobile device 3000 according to embodiments of the inventive concept. Referring to FIG. 22, the mobile device 3000 may include an application processor (AP, 3100), at least one buffer memory 3200, at least one storage device 3300, at least one sensor 3400, and a display/touch module 3500. For example, the mobile device 3000 may be implemented by a laptop computer, a mobile phone, a smartphone, a tablet personal computer (PC), or a wearable computer.

An application processor (AP, 3100) may be implemented to control overall operations of the mobile device 3000. The application processor 3100 may execute applications providing Internet browsers, games, and videos. In an example embodiment, the application processor 3100 may include a single core or multi-core. In an example embodiment, the application processor 3100 may further include a cache memory disposed internally or externally of the application processor 3100. Also, the application processor 3100 may optionally include a controller, a neural processing unit (NPU), and the like.

In an example embodiment, the application processor 3100 may be implemented as a system-on-chip (SoC). A kernel of an operating system running on the system on a chip (SoC) may include an input and output scheduler and a device driver for controlling the storage device 3300. The device driver may control access performance of the storage device 3300 by referring to the number of synchronous queues managed by the input and output scheduler, or may control a CPU mode, a DVFS level, etc. in the SoC.

The buffer memory 3200 may be implemented to store data necessary for operation of the application processor 3100. For example, the buffer memory 3200 may temporarily store an operating system (OS) and application data, or may be used as an execution space of various software codes. Also, the buffer memory 3200 may store data related to artificial intelligence computation. In an example embodiment, the buffer memory 3200 may be implemented as a DRAM or a PRAM.

The storage device 3300 may be implemented to store user data. The storage device 3300 may be included in the mobile device 3000 in an embedded form. In another example embodiment, the storage device 3300 may be included in the mobile device 3000 in a detachable manner.

The storage device 3300 may store data collected from at least one sensor, or may store data network data, augmented reality (AR)/virtual reality (VR) data, and high definition (HD) content. The storage device 3300 may include a solid state driver (SSD), an embedded multimedia card (eMMC), and the like.

At least one sensor 3400 may be implemented to perform various sensing operations.

The display/touch module 3500 may be implemented to output data or to input data through a touch. For example, the display/touch module 3500 may output the sensed image data using at least one sensor, or may output calculated data using the application processor 3100. Also, the display/touch module 3500 may recognize a user's touch.

Figure 23:
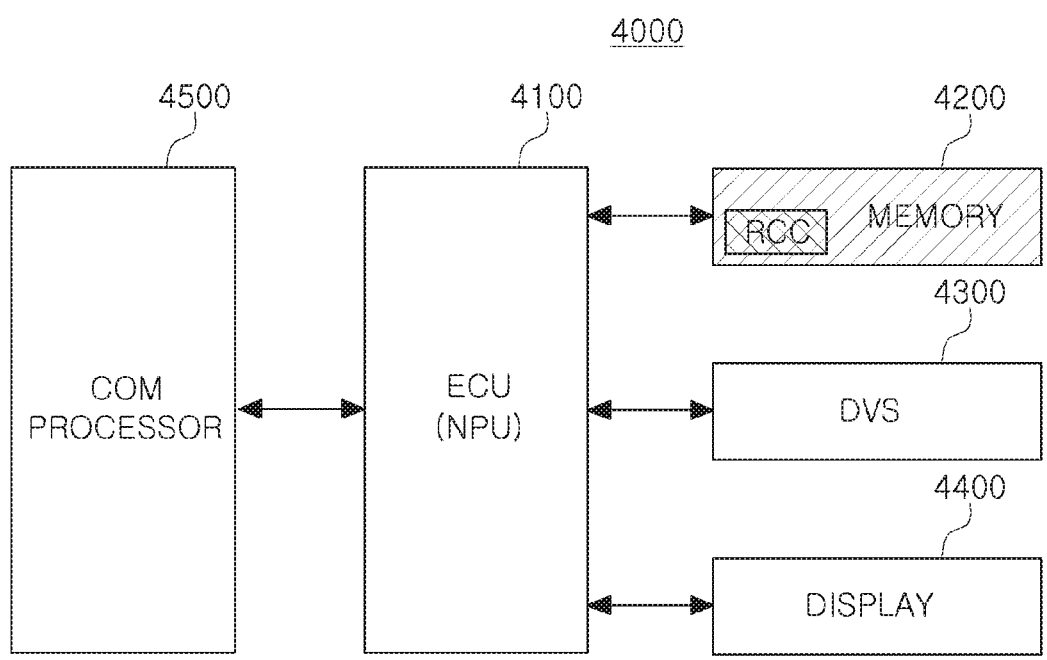
FIG. 23 is a block diagram illustrating an electronic system according to embodiments of the inventive concept.

FIG. 23 is a block diagram illustrating an electronic system 4000 according to embodiments of the inventive concept. Referring to FIG. 23, an electronic system 4000 used for a vehicle may include an electronic control unit (ECU) 4100, a memory device 4200, at least one dynamic range sensor (DVS) 4300, a display device 4400, a communication processor (4500), and a security ECU 4600.

The ECU 4100 may be implemented to control overall operation. The ECU 4100 may process image data received from the DVS 4300. The ECU 4100 may include a neural processing unit (NPU). The NPU may swiftly derive an optimal image for driving by comparing the image received from the DVS 4300 with a learning model.

The memory device 4200 may be implemented to store a learning model related to operation of the NPU. The memory device 4200 may include a volatile or non-volatile memory device. For example, the memory device 4200 may be implemented as a DRAM, a PRAM, a NAND flash memory, or the like. The memory device 4200 in the example embodiment may be implemented to perform the retraining checking operation and the retraining operation described with reference to FIGS. 1 to 19.

The DVS 4300 may be implemented to sense an external environment of a vehicle. The DVS 4300 may output an event signal in response to a change in relative light intensity. The DVS 4300 may include a pixel array including a plurality of DVS pixels and address event processors.

The display device 4400 may be implemented to display an image processed by the ECU 4100 or an image transmitted by the communication processor 4500.

The communication processor 4500 may be implemented to transmit the processed image to an external device, such as an external vehicle, for example, or to receive an image from an external vehicle. Accordingly, the communication processor 4500 may be implemented to communicate with an external device in a wired or wireless manner.

Figure 24:
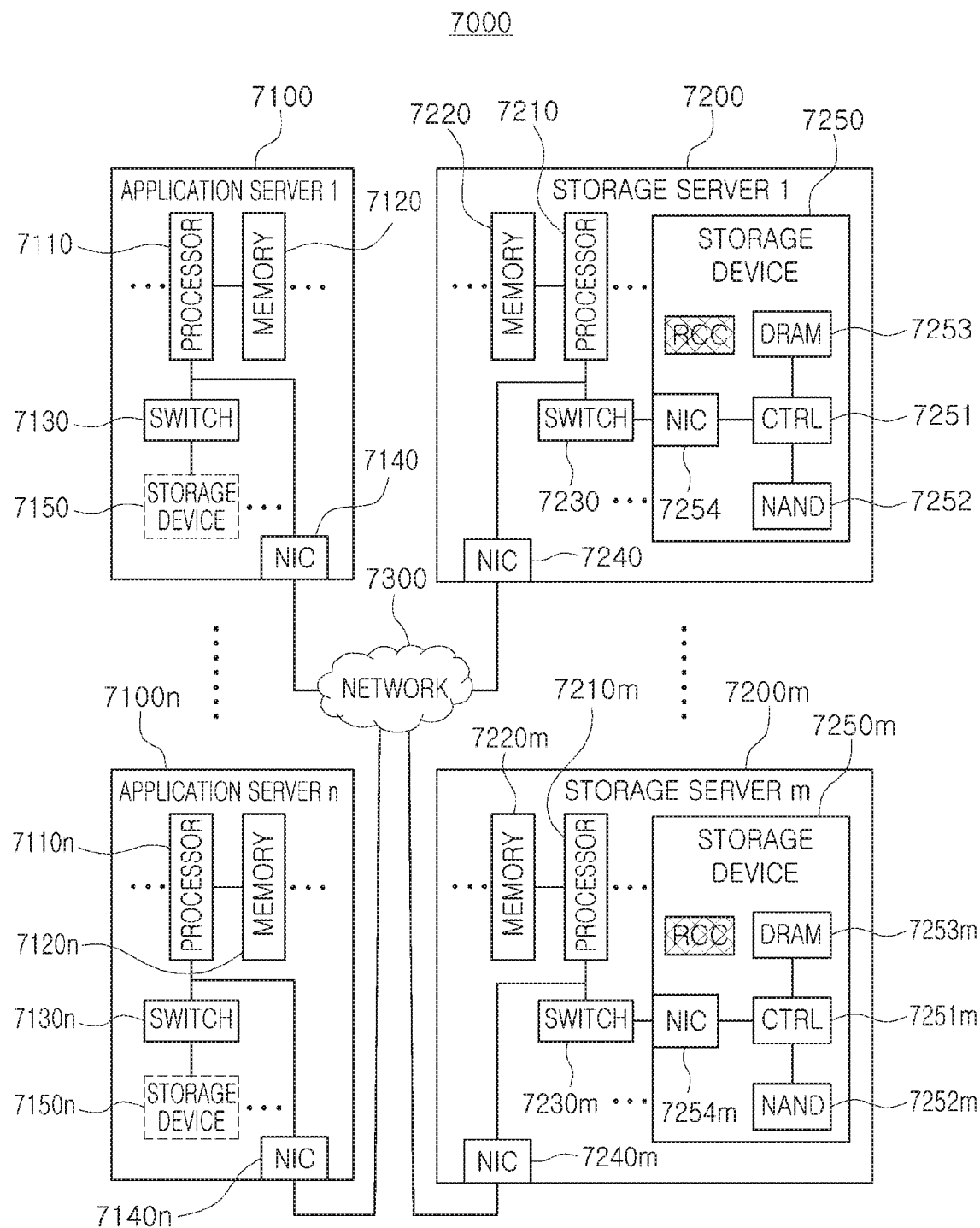
FIG. 24 is a diagram illustrating a data center in which a memory device is applied according to embodiments of the inventive concept.

FIG. 24 is a diagram illustrating a data center in which a memory device is applied according to embodiments of the inventive concept. Referring to FIG. 24, a data center 7000 may be implemented as a facility which may collect various data and may provide services, and may be referred to as a data storage center. The data center 7000 may be implemented as a system for operating a search engine and a database, and may be implemented as a computing system used in companies such as banks or government organizations. The data center 7000 may include application servers 7100 to 7100n and storage servers 7200 to 7200m. The number of the application servers 7100 to 7100n and the number of the storage servers 7200 to 7200m may be varied in example embodiments, and the number of the application servers 7100 to 7100n may be different from the number of the storage servers 7200 to 7200m.

The application server 7100 or the storage server 7200 may include at least one of processors 7110 and 7210 and memories 7120 and 7220. Referring to the storage server 7200 as an example, the processor 7210 may control overall operation of the storage server 7200, and may access the memory 7220 and may execute a command and/or data loaded in the memory 7220. The memory 7220 may be implemented as a double data rate synchronous DRAM (DDR SDRAM), a high bandwidth memory (HBM), a hybrid memory cube (HMC), a dual in-line memory module (DIMM), an Optane DIMM or an non-volatile DIMM (NVMDIMM). In example embodiments, the number of the processors 7210 and the number of the memories 7220 included in the storage server 7200 may be varied. In an example embodiment, the processor 7210 and the memory

7220 may provide a processor-memory pair. In an example embodiment, the number of the processor 7210 may be different from the number of the memory 7220. The processor 7210 may include a single-core processor or a multi-core processor. The above description of the storage server 7200 may be similarly applied to the application server 7100. In example embodiments, the application server 7100 may not include the storage device 7150. The storage server 7200 may include at least one or more storage devices 7250. The number of the storage devices 7250 included in the storage server 7200 may be varied in example embodiments.

The application servers 7100 to 7100*n* and the storage servers 7200 to 7200*m* may communicate with each other through a network 7300. The network 7300 may be implemented using fiber channel (FC) or Ethernet. In this case, an FC may be a medium used for relatively high-speed data transmission, and an optical switch providing high performance/high availability may be used. Depending on an access method of the network 7300, the storage servers 7200 to 7200*m* may be provided as file storages, block storages, or object storages.

In an example embodiment, the network 7300 may be implemented as a network exclusively used for storage, such as a storage area network (SAN). For example, the SAN may be implemented as an FC-SAN using an FC network and implemented according to an FC Protocol (FCP). As another example, the SAN may be implemented as an IP-SAN using a TCP/IP network and implemented according to an iSCSI (SCSI over TCP/IP or Internet SCSI) protocol. In another example embodiment, the network 7300 may be implemented as a general network, such as a TCP/IP network. For example, the network 7300 may be implemented according to protocols such as FC over Ethernet (FCoE), network attached storage (NAS), NVMe over Fabrics (NVMe-oF), or the like.

In the description below, the application server 7100 and the storage server 7200 will be mainly described. The description of the application server 7100 may be applied to the other application server 7100*n*, and the description of the storage server 7200 may be applied to the other storage server 7200*m*.

The application server 7100 may store data which a user or a client requested to store in one of the storage servers 7200 to 7200*m* through the network 7300. Also, the application server 7100 may acquire data which a user or a client requested to read from one of the storage servers 7200 to 7200*m* through the network 7300. For example, the application server 7100 may be implemented as a web server or a database management system (DBMS).

The application server 7100 may access the memory 7120*n* or the storage device 7150*n* included in the other application server 7100*n* through the network 7300, or may access the memory 7220 to 7220*m* or the storage devices 7250 to 7250*m* included in the storage severs 7200 to 7200*m* through the network 7300. Accordingly, the application server 7100 may perform various operations with respect to data stored in the application servers 7100 to 7100*n* and/or the storage servers 7200 to 7200*m*. For example, the application server 7100 may execute a command to move or copy data between the application servers 7100 to 7100*n* and/or the storage servers 7200 to 7200*m*. In this case, the data may move from the storage devices 7250 to 7250*m* of the storage servers 7200 to 7200*m*, to the memories 7220 to 7220*m* of the storage servers 7200 to 7200*m*, and to memories 7120 to 7120*n* of the application servers 7100 to 7100*n*. The data moving through the network 7300 may be encrypted for security or privacy.

Referring to the storage server 7200 as an example, the interface 7254 may provide a physical connection between the processor 7210 and the controller 7251 and a physical connection between the NIC 7240 and the controller 7251. For example, the interface 7254 may be implemented by a direct attached storage (DAS) method which may directly connect the storage device 7250 using a dedicated cable. Also, for example, the interface 1254 may be implemented by various interface methods such as advanced technology attachment (ATA), serial ATA (SATA), external SATA (e-SATA), small computer small interface (SCSI), serial attached SCSI (SAS), peripheral PCI component interconnection (PCI), PCIe (PCI express), NVM express (NVMe), IEEE 1394, a universal serial bus (USB), a secure digital (SD) card, a multi-media card (MMC), an embedded multi-media card (eMMC), universal flash storage (UFS), embedded universal flash storage (eUFS), and a compact flash (CF) card interface.

The storage server 7200 may further include a switch 7230 and a NIC 7240. The switch 7230 may selectively connect the processor 7210 to the storage device 7250 under control of the processor 7210, or may selectively connect the NIC 7240 to the storage device 7250.

In an example embodiment, the NIC 7240 may include a network interface card, a network adapter, and the like. The NIC 7240 may be connected to the network 7300 by a wired interface, a wireless interface, a Bluetooth interface, an optical interface, or the like. The NIC 7240 may include an internal memory, a DSP, a host bus interface, and the like, and may be connected to a processor 7210 and/or a switch 7230 through a host bus interface. The host bus interface may be implemented as one of the examples of the interface 7254 described above. In an example embodiment, the NIC 7240 may be integrated with at least one of the processor 7210, the switch 7230, and the storage 7250.

In the storage servers 7200 to 7200*m* or the application server 7100 to 7100*n*, the processor may transmit a command to the storage devices 7130 to 7130*n* and 7250 to 7250*m* or the memories 7120 to 7120*n* and 7220 to 7220*m* and may program or read data. In this case, the data may be error-corrected data of which an error has been corrected through an error correction code (ECC) engine. The data may be data bus inversion (DBI) processed data or data masking (DM) processed data, and may include cyclic redundancy code (CRC) information. The data may be encrypted data, encrypted for security or privacy.

The storage devices 7150 to 7150*m* and 7250 to 7250*m* may transmit a control signal and a command/address signal to the NAND flash memory devices 7252 to 7252*m* in response to a read command received from the processor. Accordingly, when data is read from the NAND flash memory devices 7252 to 7252*m*, a read enable (RE) signal is input as a data output control signal, and may output data to a DQ bus. A data strobe (DQS) may be generated using an RE signal. A command and an address signals may be latched into the page buffer depending on a rising edge or a falling edge of a write enable (WE) signal.

In an example embodiment, the storage devices 7150 to 7150*m* and 7250 to 7250*m* may be implemented through the storage device and a retraining operation thereof described with reference to FIGS. 1 to 19.

The controller 7251 may control overall operation of the storage device 7250. In an example embodiment, the controller 7251 may include a static random access memory (SRAM). The controller 7251 may write data in the NAND flash 7252 in response to a write command, or may read data from the NAND flash 7252 in response to a read command.

For example, the write command and/or read command may be provided from a processor 7210 in the storage server 7200, a processor 7210m in another storage server 7200m, or processors 7110 and 7110n in the application servers 7100 and 7100n. The DRAM 7253 may temporarily store (buffer) data to be written in the NAND flash 7252 or data read from the NAND flash 7252. Also, the DRAM 7253 may store meta data. The meta data may be user data or data generated by the controller 7251 to manage the NAND flash 7252.

According to the aforementioned example embodiments, as for the storage device and a retraining method thereof, by including an interface chip which may determine whether retraining is necessary using an unselected channel and may transmit a retraining request according to a result of the determination to the controller, the storage device may automatically correspond to changes in timing caused by a frequency, a voltage, or a temperature.

Also, as for the storage device and a retraining method thereof in the example embodiment, as the interface chip transmits a retraining request to the controller, retraining may be performed without temporal/regional limitations.

While the example embodiments have been shown and described above, it will be apparent to those skilled in the art that modifications and variations could be made without departing from the scope of the inventive concept as defined by the appended claims.

What is claimed is:

1. A storage device, comprising:
a non-volatile memory (NVM) package; and
a controller connected to the NVM package through a channel, and configured to control the NVM package,
wherein the NVM package includes an interface chip, first NVM devices connected to the interface chip through a first internal channel and second NVM devices connected to the interface chip through a second internal channel,
the interface chip is configured to select the first internal channel in response to an operation request received from the controller and connect the first internal channel to the channel, and to determine whether retraining is necessary in relation to the second internal channel and transmit a retraining request to the controller when retraining is necessary.

2. The storage device of claim 1, wherein upon determining that retraining is necessary, the interface chip outputs a retraining request to the controller through at least one dedicated pin.

3. The storage device of claim 1, wherein the interface chip includes a retraining checking circuit configured to determine whether retraining is necessary in relation to the second internal channel.

4. The storage device of claim 3, wherein the operation request is a read request, and
the interface chip includes an activation signal generator configured to receive chip selection information and generate an activation signal in response to a read enable signal to activate the retraining checking circuit.

5. The storage device of claim 4, wherein the interface chip further includes a chip enable signal decoder configured to receive at least one chip enable signal from the controller and output the chip selection information.

6. The storage device of claim 3, wherein the operation request is a read request, and
the interface chip includes a counter configured to receive chip selection information, count a read enable signal to generate a counted value to activate the retraining checking circuit, and generate an activation signal by comparing the counted value with a reference value.

7. The storage device of claim 6, wherein the interface chip further includes a reference value storage device configured to store the reference value.

8. The storage device of claim 1, wherein upon determining that retraining is necessary, the interface chip outputs the retraining request to the controller using a status read.

9. The storage device of claim 8, wherein the interface chip further includes compare logic configured to compare an output value of the retraining checking circuit and a status read result value corresponding to a status read command.

10. The storage device of claim 1, wherein the operation request is a write request, and
the interface chip determines whether retraining is necessary while performing a write operation for a NVM device connected to the first internal channel in response to the write request.

11. A storage device, comprising:
a non-volatile memory (NVM) package including an interface chip, first NVM devices connected to the interface chip through a first internal channel, and second NVM devices connected to the interface chip through a second internal channel,
wherein the interface chip is configured to select one of the first internal channel and the second internal channel, thereby designating one of the first internal channel and the second internal channel as a selected internal channel and designating other one of the first internal channel and the second internal channel as an unselected internal channel, and
the interface chip is further configured to determine whether retraining of the unselected internal channel is necessary and upon determining that retraining of the unselected internal channel is necessary, providing a retraining request; and
a controller connected to the interface chip through a channel, wherein the controller is configured to transmit a retraining command to the NVM package in response to the retraining request.

12. The storage device of claim 11, wherein the controller is further configured to transmit a status read command to the interface chip using one of a DQ signal and a write enable signal, and to receive the retraining request corresponding to the status read command using one of the DQ signal and a DQS signal provided by the interface chip.

13. The storage device of claim 11, wherein the controller periodically receives the retraining request from the interface chip through a dedicated pin.

14. The storage device of claim 11, wherein the controller provides one of a write request and a read request to the NVM package.

15. A retraining method for a storage device, the method comprising:
determining whether retraining is necessary in relation to an unselected internal channel by an interface chip; and
transmitting a retraining request from the interface chip to a controller upon determining that the retraining is necessary;
wherein the transmitting of the retraining request to the controller comprises:
logic-calculating a status read value corresponding to a status read command and the retraining request corresponding to a result of the determination; and
transmitting the logic-calculation value to the controller.

16. The method of claim 15, further comprising:
transmitting one of a write request and a read request to a corresponding non-volatile memory device using a selected internal channel.

17. The method of claim 15, wherein the determining of whether retraining is necessary comprises:
activating a retraining checking circuit in response to a read enable signal;
outputting expected data to the unselected internal channel;
receiving sample data from the unselected internal channel;
comparing the expected data with the sample data; and
generating the retraining request according to a result of comparing the expected data and the sample data.

18. The method of claim 15, wherein the determining of whether the retraining is necessary comprises:
counting a DQS signal of the unselected internal channel to generate a counted value;
comparing the counted value with a reference value; and
generating the retraining request according to a result of the comparing of the counted value and the reference value.

19. The method of claim 15, wherein the transmitting of the retraining request to the controller comprises:
transmitting the retraining request via a dedicated pin.

* * * * *